US008826255B1

(12) United States Patent
Avadhanula et al.

(10) Patent No.: US 8,826,255 B1
(45) Date of Patent: Sep. 2, 2014

(54) RESTRUCTURING CONTROL FLOW GRAPHS GENERATED FROM A MODEL

(75) Inventors: Srinath Avadhanula, Framingham, MA (US); Vijay Raghavan, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1017 days.

(21) Appl. No.: 11/820,058

(22) Filed: Jun. 18, 2007

(51) Int. Cl.
*G06F 9/45* (2006.01)

(52) U.S. Cl.
USPC .......................... 717/156; 717/159; 717/154

(58) Field of Classification Search
None
See application file for complete search history.

(56) References Cited

U.S. PATENT DOCUMENTS

| | | | | |
|---|---|---|---|---|
| 5,548,761 A * | 8/1996 | Balasundaram et al. | ..... | 717/159 |
| 5,889,999 A * | 3/1999 | Breternitz et al. | ............ | 717/158 |
| 6,128,775 A * | 10/2000 | Chow et al. | ................... | 717/156 |
| 7,100,156 B2 * | 8/2006 | Archambault | ................ | 717/159 |
| 7,433,808 B1 * | 10/2008 | Raghavan et al. | ................ | 703/2 |
| 7,503,027 B1 * | 3/2009 | Zhao et al. | .................... | 716/104 |
| 7,568,193 B2 * | 7/2009 | Rubin et al. | ................... | 717/159 |
| 7,657,876 B2 * | 2/2010 | Chilimbi | ....................... | 717/156 |
| 7,720,656 B2 * | 5/2010 | Raghavan et al. | ................ | 703/6 |
| 7,856,628 B2 * | 12/2010 | Li et al. | ......................... | 717/159 |
| 7,926,037 B2 * | 4/2011 | Leino et al. | ................... | 717/159 |
| 8,046,751 B1 * | 10/2011 | Avadhanula et al. | ......... | 717/156 |
| 8,181,171 B2 * | 5/2012 | Ito et al. | ........................ | 717/156 |
| 8,296,748 B2 * | 10/2012 | Cheng et al. | .................. | 717/154 |
| 8,418,158 B1 * | 4/2013 | Koh et al. | ...................... | 717/154 |
| 8,555,266 B2 * | 10/2013 | Copeland et al. | ............. | 717/154 |
| 2003/0233640 A1 * | 12/2003 | Reynaud | ....................... | 717/154 |
| 2004/0073413 A1 * | 4/2004 | Aberg et al. | ...................... | 703/2 |
| 2004/0154009 A1 * | 8/2004 | Reynaud | ....................... | 717/155 |
| 2006/0064680 A1 | 3/2006 | Devane | | |
| 2007/0018986 A1 | 1/2007 | Hauser | | |
| 2008/0127148 A1 * | 5/2008 | Moudgill et al. | ............. | 717/154 |
| 2009/0007087 A1 * | 1/2009 | Ito et al. | ........................ | 717/156 |

OTHER PUBLICATIONS

V. Sarkar, "Automatic selection of high-order transformatins in the IBM XL FORTRAN compilers", vol. 41 No. 3 May 1997, IBM J. Res. Develop., [retrieved on Jun. 7, 2011], Retrieved from the Internet: <URL: http://ieeexplore.ieee.org/stamp/stamp.jsp?tp=&arnumber=5389392>, pp. 233-264.*

Tomita, "Disambiguating Grammatically Ambiguous Sentences By Asking", Proceedings of the 10th International Conference on computational Linguistics and 22nd annual meeting on Association for Computational Linguistics 1984; [retrieved on Sep. 7, 2011]; Retrieved from Internet <URL:http://dl.acm.org/citation.cfm?id=980431.980593>; pp. 476-480.*

(Continued)

*Primary Examiner* — Xi D Chen
(74) *Attorney, Agent, or Firm* — Venable LLP; Michael A. Sartori; Todd R. Farnsworth

(57) ABSTRACT

A control flow graph may be generated from a model. The control flow graph may be restructured by converting at least one cyclical unstructured region of a control flow graph into a structured region. The restructuring may involve introducing loop head and/or bottom nodes, serving as incident nodes for loop entry or exit, correspondingly. Loop back-edges may be re-routed to loop entry nodes, while all exit nodes may be re-rerouted to loop exit nodes, as long as the control flow within the loop is properly directed using control flow constructs.

57 Claims, 33 Drawing Sheets

(56) References Cited

OTHER PUBLICATIONS

Baker, "An Algorithm for Structuring Flowgraphs", ACM 1977; [retrieved on Nov. 14, 2013]; Retrieved from Internet <URL:http://dl.acm.org/citation.cfm?id=321992>;pp. 98-120.*

Zhang, D'Hollander, "Using Hammock Graphs to Structure Programs", 2004 IEEE; [retrieved on May 2, 2014]; Retrieved from Internet <URL:http://ieeexplore.ieee.orrg/stamp/stamp.jsp?tp=&arunmber=1274043>;pp. 231-245.*

Ranganath, et al., "A New Foundation for Contol Dependence and Slicing for Modern Program Structures", 2007 ACM; [retrieved on May 2, 2014]; Retrieved from Internet <URL:http://dl.acm.org/citation.cfm?id=1275497>;pp. 27-69.*

Kowshik, Kumar, "Optimal Function Computation in Directed and Undirected Graphs", 2012 IEEE; [retrieved on May 2, 2014]; Retrieved from Internet <URL:http://ieeexplore.ieee.orrg/stamp/stamp.jsp?tp=&arunmber=6157622>;pp. 3407-3418.*

Kastner, Wilhelm, "Genric Control Flow Reconstruction ffrom Assembly Code"; 2002 ACM;[retrieved on May 2, 2014]; Retrieved from Internet <URL:http://dl.acm.org/citation.cfm?id=513829>;pp. 46-55.*

Cifuentes, Cristina, "A Structuring Algorithm for Decompilation," Proceedings of the XIX Conferencia Latinoamericana de Informatica, pp. 267-276 (1993).

Erosa, Ana M. et al., "Taming Control Flow: A Structured Approach to Eliminating Goto Statements," Proceedings of the 1994 International Conference on Computer Languages, pp. 229-240 (1994).

Pan, Si et al., "A Formal Basis for Removing Goto Statemenst," The Computer Journal, vol. 39(3):203-214 (1996).

Williams, M.H. et al., "Conversion of unstructured flow diagrams to structured form," The Computer Journal, vol. 21(2):161-167 (1978).

\* cited by examiner

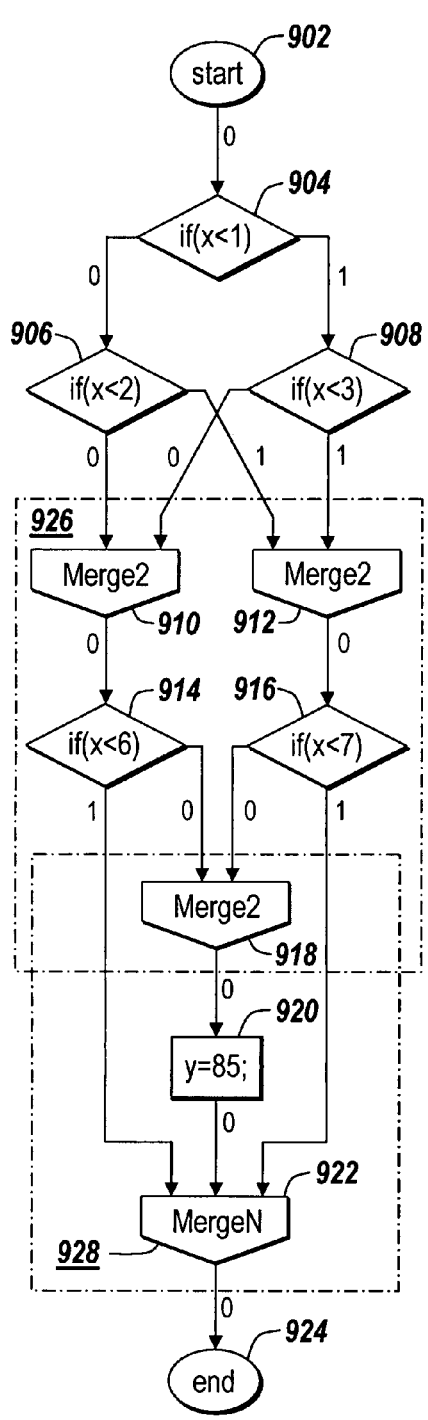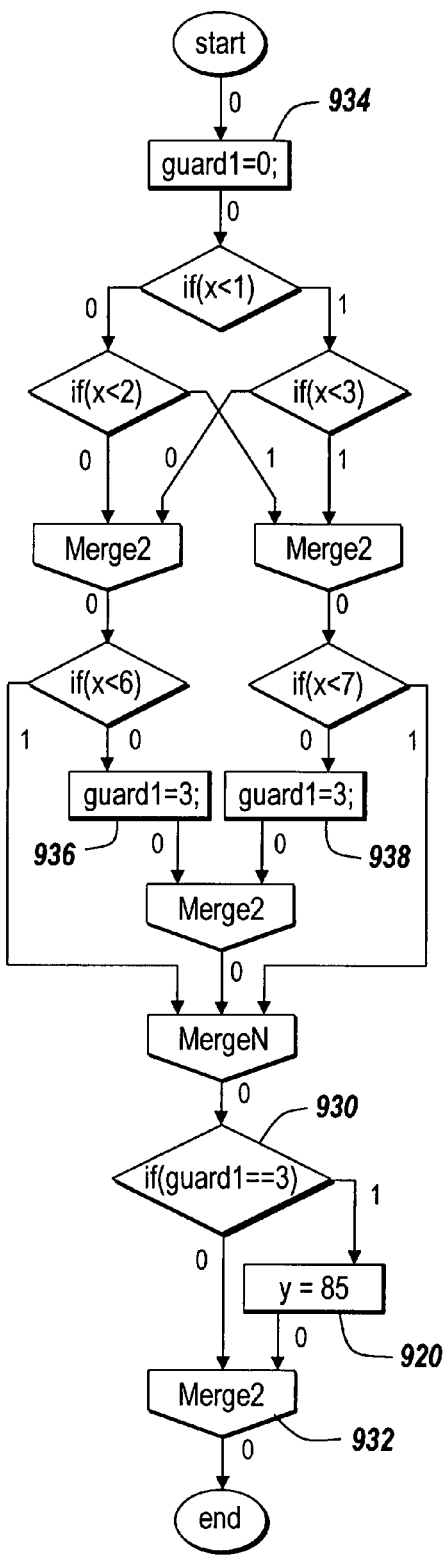
Fig. 9A
Fig. 9B

```
void c1_unstructured(void)
{
    if((boolean_T)c1 != 0) {          ─1204
        a1();   ─1206
    } else {
        a2();   ─1216
        if((boolean_T)c3 != 0) {      ─1208
            a3();   ─1220
        } else {
            a4();   ─1214
            goto label_1;   ─1232
        }
    }
    a5();   ─1218
    label_1:;   ─1234
    y = 10.0;   ─1236
}
```

*Fig. 12C*

```
void c1_unstructured(void)
{
                                          ╱─ 1302
  boolean_T guard1 = false;
  guard1 = false;  ~1302
                                  ╱─ 1204
  if((boolean_T)c1 != 0) {
    a1(); ~1206        ⎫
                       ⎬ 1306
    guard1 = true;     ⎭
  } else {
    a2(); ~1216
                                  ╱─ 1208
    if((boolean_T)c3 != 0) {
      a3(); ~1220      ⎫
                       ⎬ 1320
      guard1 = true;   ⎭
    } else {
      a4(); ~1214
    }
  }                         ╱─ 1312
  if(guard1 == true) {
    a5(); ~1218
  }              ╱─ 1236
  y = 10.0;
}
```

*Fig. 13B*

RESTRUCTURING CONTROL FLOW GRAPHS GENERATED FROM A MODEL

BACKGROUND

Graphical and/or textual models are used in a multitude of areas of engineering and design to design, test and verify systems applicable to almost all fields of human endeavor, from biological systems, to mechanical and/or electrical systems, to finance and statistics applications. Model-based design typically involves representing a real-world system using a model, which model may then be tested, improved, and/or used to implement the actual system.

Logic or structure of a model or of any generic software and/or hardware program or module may be represented as a control flow graph (CFG). A CFG is a directed graph, in which nodes represent computational statements, elements or expressions, and edges represent transfer of control between nodes. A control flow typically includes all possible execution paths, and each possible execution path of the module has a corresponding path from the entry to the exit node of the graph.

Control flow graphs may be represented graphically and/or textually, or as in-memory representations. There are numerous uses for control flow graphs: code optimization, compilation and interpretation, code visualization, static analysis, dynamic testing, etc. In general, a control flow graph is one of many possible representations of a software and/or hardware module. The CFG may be an intermediate representation, derived from the original representation, or the software or graphical code itself may represent a control flow graph.

A typical control flow graph may have a single entry node and a single exit node, with one or more paths in between, indicating possible flow of execution. Control flow graphs may be viewed as hierarchical—that is, a block in a single entry single exit (SESE) CFG may sometimes be represented as a SESE control flow graph. Conversely, a single entry single exit region of a CFG may be abstracted into one or more blocks in a larger CFG. Such hierarchical change of levels of representation is often used in compilation, optimization, static analysis, and other applications, where it may be useful to analyze a portion of the module at different levels of detail. In some cases, a compiler, optimizer or analyzer may make several paths through a CFG, creating blocks of out sub-graphs or subdividing blocks into SESE sub-graphs.

Control flow graphs may contain cycles, also referred to as "loops,"—that is, sections where one or more exits from a block lead to a path in a graph already traveled on the way to that block. Elements within and outside of the cycles may be subdivided into various SESE sub-graphs, and the cycles themselves may be restructured during compilation or optimization, although most frequently a cycle cannot be optimized out to non-cyclical structures altogether.

Control flow graphs may be expressed in a number of ways: graphically, textually or in a combination thereof. CFGs may be a final result of compilation or code generation, or they may be used for code generation. It is usual for an intermediate representation, used in code generation, compilation, execution or analysis, to be a representation of a control flow graph. Moreover, some assembly or hardware representations specifically represent a control flow graph. For example, a section of assembly-level code may be thought as a CFG.

SUMMARY OF THE INVENTION

A control flow graph may be generated from a model. The control flow graph may be restructured by converting at least one unstructured region of a control flow graph into a structured region. An unstructured region is a region, which results in GOTO or similar constructs in generated code. An unstructured region may contain an unstructured cycle. An unstructured cycle is a cycle that contains more than one entry node or more than one exit nodes. The restructuring may include locating at least one unstructured loop, moving sections of the loop outside the loop, and guarding the moved sections of the loop with a test of at least one guard variable.

Loop restructuring may involve introducing loop head and/or bottom nodes, serving as incident nodes for loop entry or exit, correspondingly. Loop back-edges may be re-routed to loop entry nodes, while all exit nodes may be re-rerouted to loop exit nodes, as long as the control flow within the loop is properly directed using control flow constructs. Such control flow constructs may employ, for example, control variables set on different paths through the loop and entry/exit controllers routing the flow of control based on the values of one or more control variables.

The control variables may be a variable of various types, set to a predetermined value on every path that leads to the located code block in the control graph. A control variable may be, for example, of boolean or integer type. The control flow constructs may be tests for the predetermined value(s) that may be set on all paths that previously have led to different code regions. In languages, where variable initialization would be appropriate, the control variables may be initialized to a value different from the predetermined value.

The control flow graph with the at least one restructured loop region may be used to generate code. The generated code may be in a programming language, such as, for example, C, Java bytecode, Assembly, PLC programming language, or it may be a hardware description language, such as HDL, or VHDL, which, in turn, may be used for generating FPGA descriptions, ASIC descriptions, etc. Alternatively, FPGA or ASIC descriptions may be generated directly from the code or from the model. The generated code may be used for model property proving, model analysis, software vs. hardware trade-offs analysis, simulation, verification or any other uses, as deemed appropriate by one of skill in the art. The generated code may be in the same or different textual and/or graphical language as the original model from which the CFG is created.

BRIEF DESCRIPTION OF THE FIGURES

FIGS. 9A-D are schematic illustrations of possible reorganizations of another exemplary CFG;

FIGS. 12A-C illustrate a simple model, which results in an unstructured CFG and unstructured generated code.

FIGS. 12A-B illustrate the CFG and the generated code for the model of FIG. 12A after restructuring.

FIGS. 13A and 13B illustrate an exemplary unstructured cyclic SESE CFG region and possible corresponding code.

DETAILED DESCRIPTION OF THE INVENTION

Figure 1A:
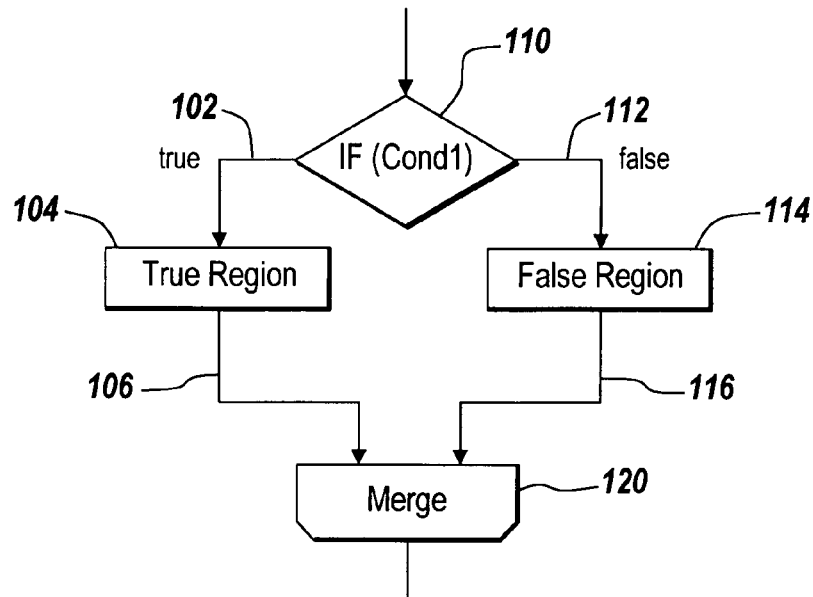
FIGS. 1A-D illustrate four exemplary structured SESE CFG regions.

A control flow graph may be generated from a model in a programming or processing environment. The model itself may be generated or edited in the same programming environment, or may be originally created using additional software applications. The model may represent a real-world system, and may be executed for purposes of design, testing and/or verification. The programming environment may be used to generate code from the model. Generated code may be in one of the software programming languages, such as C, C++, Java bytecodes, Assembly, etc., or it may be in a hardware design language, such as for, example, HDL or VHDL. In the process of generating code or executing a model, an intermediate representation may be used. Such intermediate representation may represent a control flow graph, or may itself be used to generate a control flow graph.

Control flow graphs may be cyclic (containing cycles) or acyclic (not containing any cycles), and structured or unstructured. A cyclic graph is one that has at least one edge leading out of one node to a second node, which has already been traversed on the path to the first node. Structured CFGs may typically be represented using IF-ELSE or CASE or similar statements in addition to blocks representing intermediate code sections and WHILE or similar statements representing the cyclical parts.

Unstructured CFGs are those that cannot be decomposed fully into IF-ELSE, WHILE or similar regions. Code generated from such control flow graphs usually contains GOTO statements or functionally similar constructs to properly transfer control from one region to another. As referred to herein, a CFG may be a portion of a larger CFG, and, conversely, a CFG may contain CFG regions, some of which may be structured, and some unstructured. Statements other than GOTO may cause a region to be unstructured; for example BREAK and CONTINUE commands may sometimes contribute to creating unstructured code regions. Similarly, various loop constructs may cause a region to be unstructured. Other language constructs, referred to herein as "GOTO or similar constructs" may be determined to result in unstructured code, as identified by one of skill in the art.

Unstructured CFGs may come from a variety of places or applications. For example, some graphical programming environments allow users to generate graphical programs without specific control flow restrictions. A CFG representation of a graphical program may therefore contain one or more unstructured regions and/or one or more unstructured cycles. As referred to herein, the term "unstructured region" includes both acyclical unstructured regions and unstructured cyclical regions.

A graphical programming environment is one in which visual expressions, and the interconnections among visual expressions, are used to control program functions. Many diagrammatic programming languages are structured according to a block diagram, where a set of nodes, called blocks, are interconnected by lines that represents signals. Blocks are computation entities that perform mathematical operations, transformations, or both, on data and information passed through the block diagram. Signals are data connections between various blocks. Signals have particular data types, and may also include timing and control information related to the blocks. Blocks may have sample rate or may execute at a particular rate.

One graphical programming environment is the Simulink® technical computing environment available from The MathWorks, Inc. of Natick, Mass. The Simulink® environment allows a user to create a dynamic system by constructing a block diagram from a plurality of blocks provided in a pre-defined library, or specially defined by a user. Each block produces outputs either continuously (i.e. a continuous block) or at specific points in time (i.e. a discrete block). The signals share the outputs to other blocks to indicate interactions between the blocks.

With the Simulink® environment, a user may model and simulate the behavior of a system in response to certain input and control data. Such a simulation may be performed in the diagrammatic programming environment itself, using an interpretive process. Alternately, a user may convert the block diagram or portions of it to executable code. Automatic code generation is a process where text-based program code (such as C or C++ code) is automatically produced from a diagrammatic representation. The text-based program code may then be compiled to produce an executable file or shared library. In this manner, the functionality specified in the block diagram may be exported beyond the diagrammatic programming environment to computers that lack the ability to interpret block diagrams. In yet another alternative, the block diagram may be translated to code specific for an embedded hardware target, such as a digital signal processing (DSP) chip, and this code used with the embedded hardware target to execute the functionality of the block diagram. In this manner, a block diagram may be used in rapid prototyping and testing applications, where hardware devices configured in a particular manner are required. Graphical modeling environments may model event-based systems as well as time-based systems, including continuous-time and discrete-time systems. Alternative examples of graphical modeling environments include Stateflow® from The MathWorks, Inc. of Natick, Mass., LabView by National Instruments, Inc., and UML tools such as Rhapsody® from Telelogic, etc.

Textual languages, such as, for example, C, C++, Perl, Python, Java, Javascript, FORTRAN, M (a programming language, at least a subset of which is compatible with a MATLAB® programming environment from The MathWorks, Inc. of Natick, Mass.), etc. may also generate unstructured CFGs. In general, any textual language that has a GOTO or a similar construct for specific control of execution flow may generate an unstructured CFG. Almost any language may generate unstructured loops. Additionally, languages that do not have explicit GOTO-like constructs may generate unstructured CFGs. M is an array-based language, facilitating operations on array and matrix data types. Models programmed in M or other MATLAB-compatible languages may have unstructured regions or result in generated unstructured code and/or unstructured loops. A language may be considered to be MATLAB-compatible if a subset of its commands is executable in the MATLAB® modeling environment.

Unstructured CFGs may be problematic or undesired in a number of applications or situations. For example, CFGs are typically used as an intermediate representation in code generation, such as, for example, generating C code from graphical models or diagrams. C code generated from an unstructured CFG contains one or more GOTO commands, but such commands may be in violation of some industry or customer-defined coding standards. For example, compliance with the coding guidelines of the Motor Industry Software Reliability Association (MISRA) requires absence of the GOTO statements.

In an alternative example, a CFG may be used as a code generation intermediate representation (CGIR) in hardware description language (HDL) code generation or design verification. HDL and/or design verification may be considered as backends for CGIR. Current implementations of HDL and/or design verification may not support unstructured CFGs. Some HDL implementations support structured cycles through instruction scheduling, but one or more of those HDL implementation may not be able to represent unstructured cycles, resulting in GOTO-like constructs.

In addition, some proof checkers or static analyzers do not handle GOTO-like constructs, or do not support unstructured CFGs. A number of proof checkers and static analyzers support only WHILE loop constructs. Proof checkers and static analyzers play an important role in code testing and verification, and in many situations it is advantageous to represent software and/or hardware in a form understandable to a proof checker.

Therefore, it may be desirable to convert an unstructured portion of a control flow graph into a structured portion, such that the structured portion is functionally equivalent to the unstructured portion. That is, given an unstructured SESE CFG having multiple unstructured regions, it may be possible to convert at least one of its unstructured regions into a structured SESE region.

One embodiment of the invention identifies unstructured regions in a CFG. Another embodiment converts some of the identified unstructured regions into structured regions using appropriately placed guard variables. Yet another embodiment of the invention may simplify or restructure a resulting structured CFG.

Figure 1B:
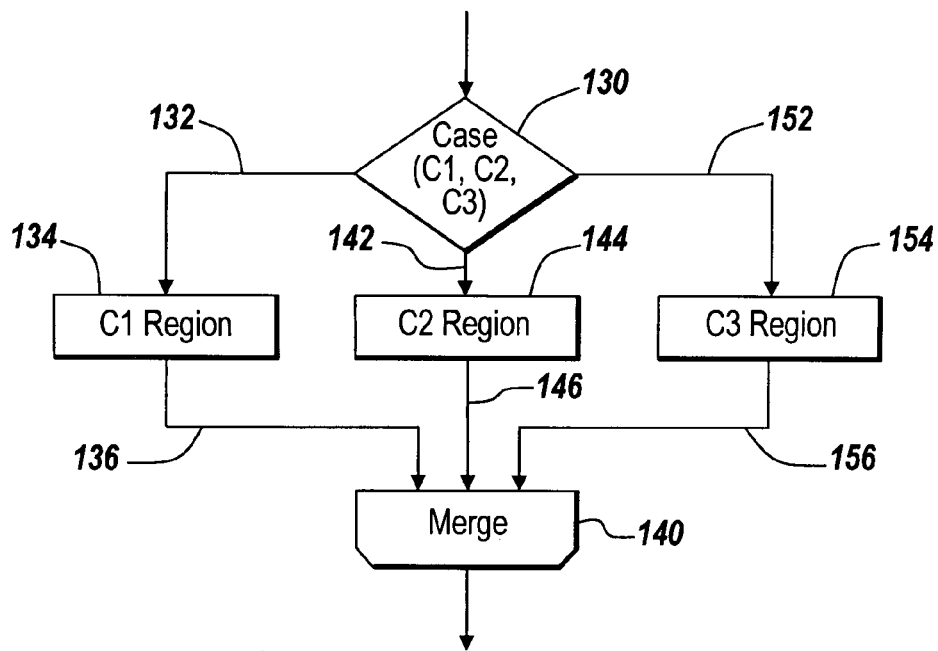
Figure 1C:
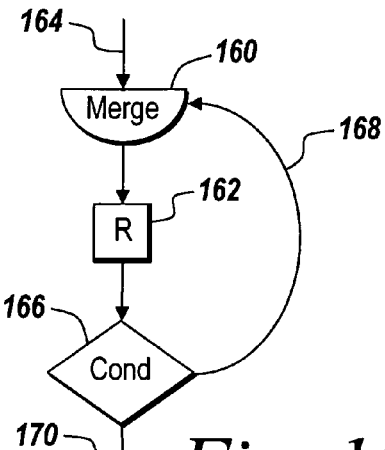
Figure 1D:
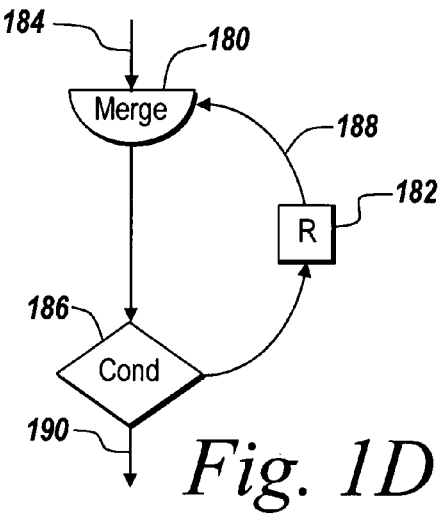

FIGS. 1A and 1B illustrate two examples of structured acyclic SESE CFG regions. FIGS. 1C and 1D illustrate two examples of structured cyclic CFG regions.

FIG. 1A is an illustration of an IF-ELSE CFG region. There is a single entry—node 110 and a single exit—node 120. In between, depending on the value of the conditional expression "Cond1" inside the IF statement, control may flow to trueRegion 104 or falseRegion 114 through edges 102 or 112, respectively, and then may converge at MERGE node 120 through edges 106 and 116, respectively.

In one exemplary embodiment, code generated from the region shown in FIG. 1A may be represented as:
```
If(Cond1) {
  TrueRegion;
}
Else {
  FalseRegion;
}
```
The words "TrueRegion" and "FalseRegion" are used to represent one or more commands or lines of code. If the generated code were to be executed, those commands or lines of code would be executed when the flow of control reaches them. In some cases, depending on the code contained inside those regions, they may be also represented as CFGs that include regions that can be further decomposed into CFGs and so on.

Similarly, FIG. 1B is an illustration of a CASE region, such as, for example, generated from a "case" or a "switch" statement. Unlike IF node 110 (FIG. 1A), CASE node 130 has three conditions, with flow of control passing to one of regions 134, 144 or 154, depending on satisfaction of one of the conditions. The three paths then merge at MERGE node 140. In one exemplary embodiment, code generated from the CFG of FIG. 1B may be represented as:
```
switch(Cond1) {
  case c1:
    C1Region;
    Break;
  case c2:
    C2Region;
    Break;
  case c3:
    C3Region;
    Break;
  default: break;
}
```
Alternatively, the flow of control shown in FIG. 1B may be functionally mirrored using IF/ELSE statements. For example, the flow of control of FIG. 1B can be represented as:
```
if (Cond1=c1) {
  C1Region;
}
else {
  if (Cond1=c2) {
    C2Region;
  }
  else {
    C3Region;
  }
}
```
As can be seen from the above examples, one CFG may represent different syntactic textual and/or graphical modules. Conversely, some CFGs different in appearance may, in fact, represent functionally equivalent modules. It also should be noted that code shown above need not have been generated from the CFGs shown in FIGS. 1A and 1B; it may have been that the CFGs have actually been generated from the code shown.

The CFGs illustrated in FIGS. 1A and 1B are structured CFGs, because code generated from them does not contain GOTO or similar statements. That is, there is no point, where flow of control jumps over the commands that would have been executed if not for the explicit instruction to go to a different command or execution point.

FIG. 1C is an illustration of a loop sometimes referred to as a DO-WHILE loop, where a set of commands R (162) is executed until a particular condition (166) is satisfied. As shown, there is only one node that serves as an entrance to the loop—MERGE node 160, having incoming edges 164 and 168. Similarly, there is only one exit node from the loop—CONDITION node 166, having outgoing edges 168 and 170. Edge 168 leads back to the entrance to the loop, while taking edge 170 would signify an exit from the loop.

In one exemplary embodiment, code generated from the CFG of FIG. 1C may be represented as:
do{
R;
} while(cond);

FIG. 1D is an illustration of yet another structured loop. As in FIG. 1C, in the CFG of FIG. 1D, there is one node serving as an entrance to the loop—MERGE node 180, leading to CONDITION node 186. If the condition is satisfied, the flow of control proceeds to block of code 182. The flow of control leaves the loop through edge 190 from CONDITION node 186.

In one exemplary embodiment, code generated from the CFG of FIG. 1D may be represented as:
while (cond) {
R;
}

Neither block 162, nor block 182 contain any BREAK, GOTO or other instructions that may allow the flow of control to leave their corresponding loops. It may be possible to rewrite a DO-WHILE loop as a WHILE loop or vice versa, by adjusting the exit conditions and any code within blocks 162 and 182 accordingly, as determined by one of skill in the art. Other loop constructs, besides WHILE or DO-WHILE may result in a structured cyclical CFG section. Such constructs may include, for example, FOR loops and even loops created using GOTO statements, so long as the conditions for creating a structured cycle are preserved.

A node belonging to a cycle and having input edges from outside of the cycle may be referred to as an "entry node." A node belonging to a cycle and having outgoing edges leading outside of the cycle may be referred to as an "exit node." In one embodiment, a cycle is considered a structured cycle if it has only one entry node and only one exit node. Entry and exit nodes may themselves be SESE CFG regions. It may be possible to combine multiple entry or exit nodes into a single SESE CFG region. In such a case, in one embodiment, a cycle will still be a structured one. In an alternative embodiment, other criteria may be used to determine whether a particular cycle is structured. For example, in one embodiment, a structured cycle may be a cycle having code blocks between an entry node and an exit node or between the exit node and the entry node, but not in both directions. In yet another embodiment of the invention, a structured cycle may be a cycle having only one entry node or only one exit node. In general, in an exemplary embodiment, a structured cycle is a cyclical CFG that does not generate GOTO-like constructs in code created based on that CFG.

Nested loops may constitute structured CFG cycles if an internal cycle may be entirely contained in an SESE CFG within an outside cycle. In such a manner, a structured CFG may contain multiple structured cycles, some chained and some contained within other structured cycles. A CFG may be structured at one level while still containing some unstructured regions at other levels, so long as those unstructured regions may be abstracted into SESE CFG regions within the larger control flow graph.

Figure 2A:
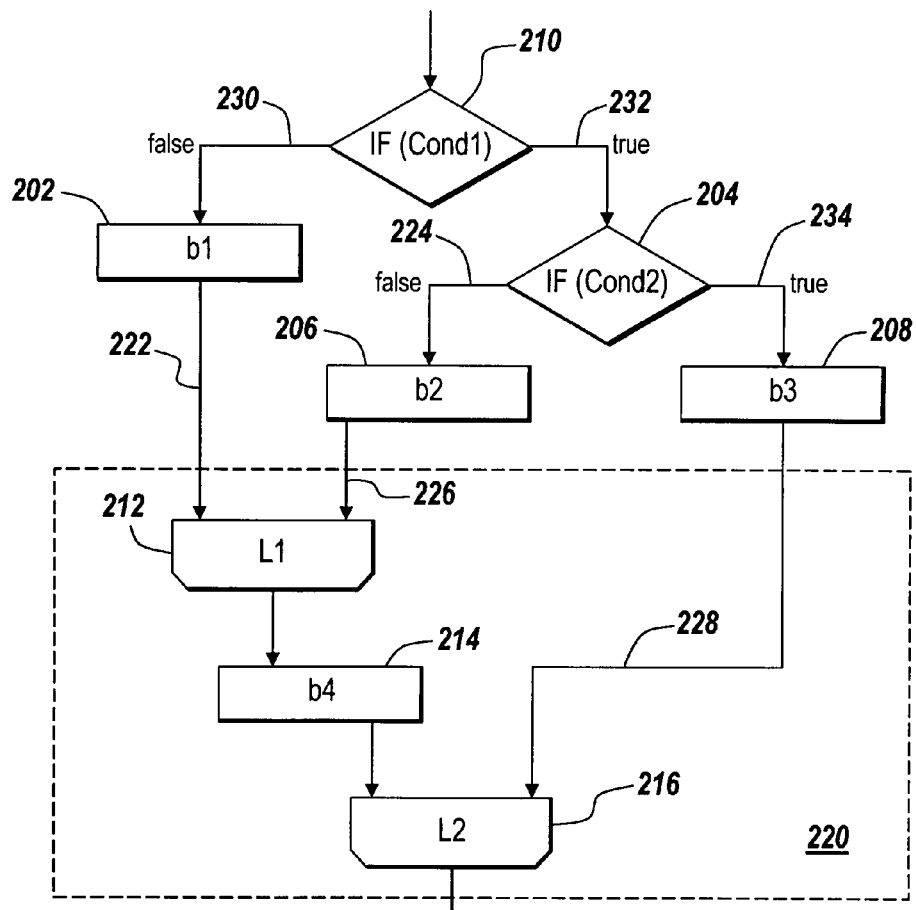
FIGS. 2A-B illustrate an exemplary unstructured acyclic SESE CFG region and possible corresponding code.
Figure 2B:
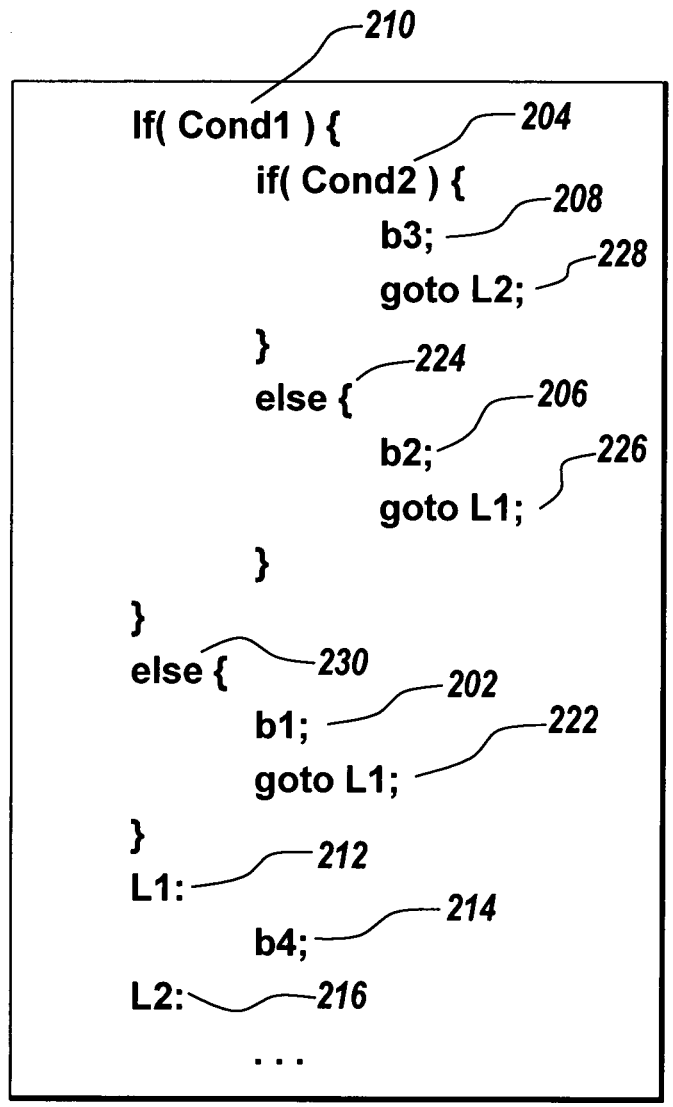

FIGS. 2A-B illustrate an example of an unstructured acyclic SESE CFG region and possible corresponding code. FIG. 2A is an illustration of an example of an unstructured CFG. It has an entry node—IF node 210, from which execution may proceed to b1 node 202 through path 230 or to another IF node (204), resulting in two additional possible execution paths, leading to blocks b2 206 and b3 208.

Execution paths from nodes 202 and 206 merge at MERGE node L1 212, after which block b4 214 should be executed. All possible execution paths merge at MERGE node L2 216, which acts as the single exit node for this portion of the control flow graph.

FIG. 2B illustrates exemplary C code corresponding to the CFG of FIG. 2A. Command lines in FIG. 2B are labeled with the same numbers as corresponding nodes and edges in FIG. 2A. In addition to IF/ELSE commands, control over execution flow is also achieved with GOTO statements (lines 228, 226, 222). While line 222 can possibly be omitted, because region L1 (212) follows directly after it, lines 228 and 226 are necessary to move the execution to a desired or proper region.

Shown on FIG. 2A, is unstructured region 220, which may correspond to the GOTO-like flow of execution of FIG. 2B. Region 220 is characterized by having a block of code (214) between two different MERGE nodes (212 and 216). In one embodiment of the invention, every section of the CFG that contains multiple MERGE nodes, which cannot be absorbed into smaller SESE regions or collapsed into existing MERGE nodes, is considered an unstructured acyclic region. For example, region 220 may be designated as unstructured because it contains two MERGE nodes (212 and 216) with at least one path (formed by edges 232, 234, and 228) leading to the second MERGE node, which does not go through the first MERGE node and so may not be absorbed into a smaller SESE region. In an alternative embodiment of the invention, additional qualifications may be used to identify an unstructured region.

As discussed above, block b4 214 may represent any SESE region, including the one containing IF/ELSE nodes or other split nodes and MERGE nodes. It may be convenient to perform restructuring at a particular level of abstraction first and then proceed to perform a similar kind of restructuring inside the SESE region identified by block b4. In an alternative embodiment of the invention, identifying unstructured regions and/or restructuring may be done "bottom-up," that is, on the smallest level first and then on a higher level. In yet another embodiment of the invention, a module performing the identification or restructuring may change levels or work on more than one level at a time, as deemed appropriate by one of skill in the art.

Restructuring of cyclical and acyclical regions may be separated or interleaved, as deemed appropriate by one of skill in the art. In one embodiment of the invention, acyclical regions may be restructured first, followed by restructuring of the cyclical regions, followed, optionally, by restructuring of any acyclical regions that may have been brought into unstructured state during the work on the cyclical regions.

In one embodiment of the invention, unstructured regions may be identified prior or separately from restructuring (if any). Such identification may be useful, for example, for purposes of indicating which regions do not confirm with code standards or would not be available for conversion to HDL or other languages lacking GOTO-like constructs.

Such identification may proceed, for example, by locating all MERGE nodes by following edges from an entry node. The edges may be followed in a depth-first or breadth-first or another type of search such as, for example, A*. Pairs of MERGE nodes may then be examined to determine whether they are part of an unstructured region, as described above. The depth-first or other kind of searches may also be used in locating unstructured cyclical regions.

In an alternative embodiment of the invention, identification of the unstructured regions may be performed in the same pass over a control flow graph, as the restructuring of those regions. It may be possible to eliminate unstructured regions by code duplication—that is, by copying the section of code to which a GOTO instruction might lead directly to the place where such an instruction would occur. For example, in FIG. 2B, section of code b4 (214) under label L1 (212) may be copied to lines 226 and 222, and section of code following label L2 (216) may be copied to line 228.

Restructuring of unstructured regions through code duplication is appropriate in some applications and may be used with the above described process of identifying unstructured regions. However, there are some situations in which code duplication is undesirable because it creates additional lines of code. Such additional lines of code may be viewed unfavorably in case of HDL generation, because HDL represents a hardware design, and extra lines of code add to the overall size of the designed hardware, whereas smaller hardware footprint is often one of the goals of hardware design.

Another class of applications where code duplication may not be appropriate includes situations where CFG is cyclical—that is, it contains one or more cycles (loops), with some edges leading to a node already traversed on the path leading to the originating node of that edge. Cycles may be common in code or CFGs generated from textual code or from some graphical diagrams. Restructuring regions through code duplication may not work within a cycle, because execution of the duplicated code may not be appropriate on every path through the loop.

In one embodiment of the invention, rewriting of the unstructured SESE CFG regions into functionally equivalent SESE CFG regions is accomplished by using guard variables. A "guard variable" is a variable introduced into a CFG or corresponding code and is used near the regions where a GOTO-like construct would be appropriate or the code regions where a GOTO might lead. A guard variable is set to a particular value before or instead of the GOTO construct. That variable is later tested before execution of the code section to which GOTO may have led. Testing may be performed inside an IF statement or any other test statement. The code is executed if the guard variable is found to have the value set in place of the GOTO command. Otherwise, the flow of execution proceeds further without executing the commands inside the IF statement. In such a way, the code that originally would have to have been under a label is "guarded" using one or more guard variables. In an alternative embodiment of the invention, in languages not requiring variable declarations, the existence or non-existence of the guard variable may itself be used as a test guarding a piece of executable code.

In some embodiments of the invention, guard variables may be introduced directly into a CFG, into a path leading to one of the MERGE nodes, allowing for the code between the two MERGE nodes to be moved below the latest one of them, provided that it is guarded by an IF/ELSE node.

Figure 3:
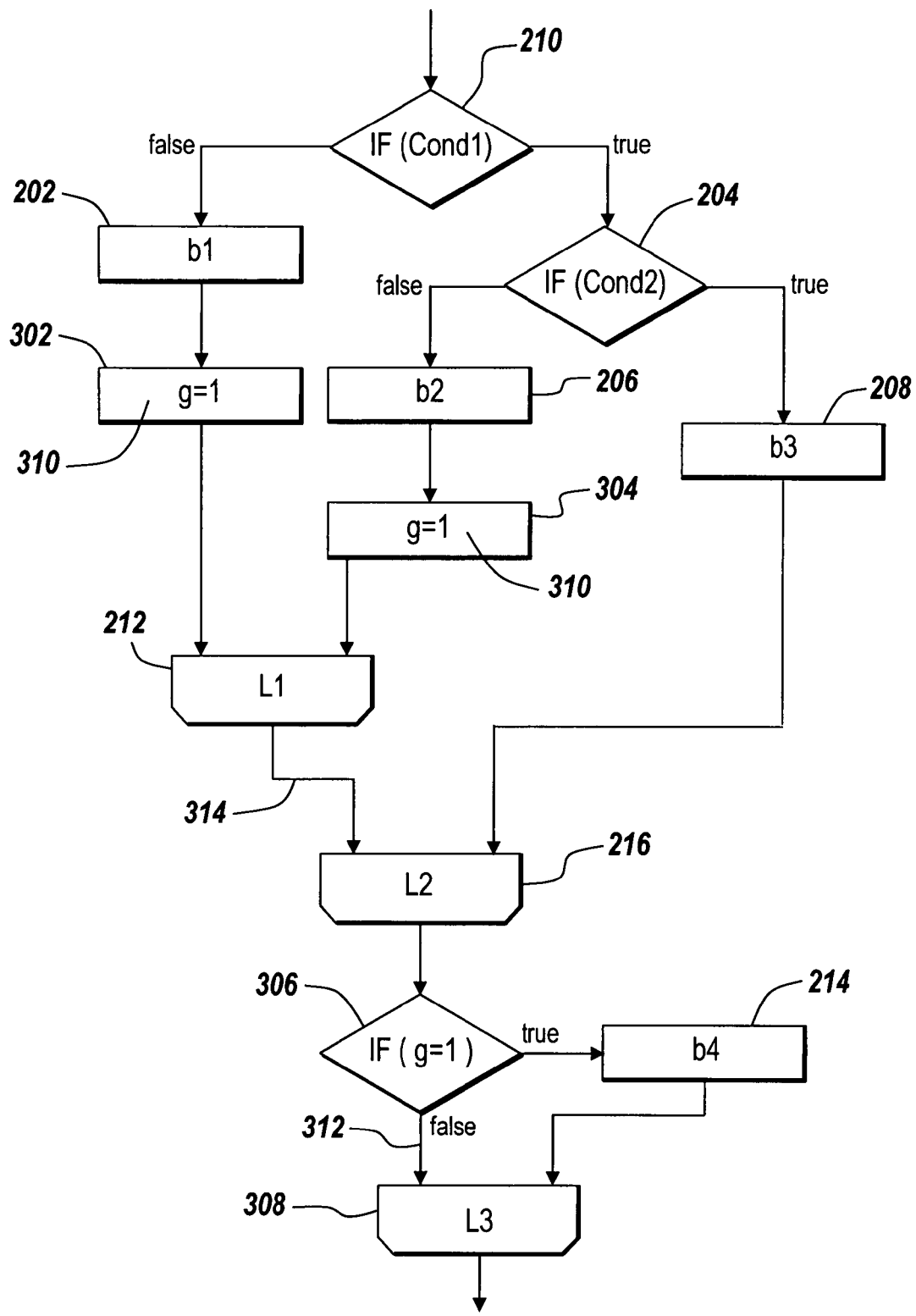
FIG. 3 is a schematic illustration of one of possible restructuring of the CFG of FIG. 2A.

FIG. 3 illustrates such restructuring of the CFG of FIG. 2A. A guard variable "g" (310) has been introduced to the CFG. It is set to be equal to "1" on all paths that originally would have led to the execution of block b4 214. The block itself has been moved below MERGE node L2 216. IF node 306 is introduced before block b4 214, checking for the value of guard variable "g" 310, so that block b4 214 is executed only if "g" is equal to "1." As can be seen, this CFG is functionally equivalent to that of FIG. 2A, because block b4 214 will get executed only under the same conditions as in FIG. 2A. However, this resulting CFG does not contain any unstructured regions, and there are no code blocks located on path 314 between MERGE nodes 212 and 216.

Once the region has been restructured and code is appropriately guarded, one embodiment may proceed with further reformatting the graph, while an alternative embodiment may keep the graph as is. The reformatting may include, for example, reorganization, merging multiple MERGE nodes into one or splitting one MERGE node into two or more MERGE nodes.

Figure 4A:
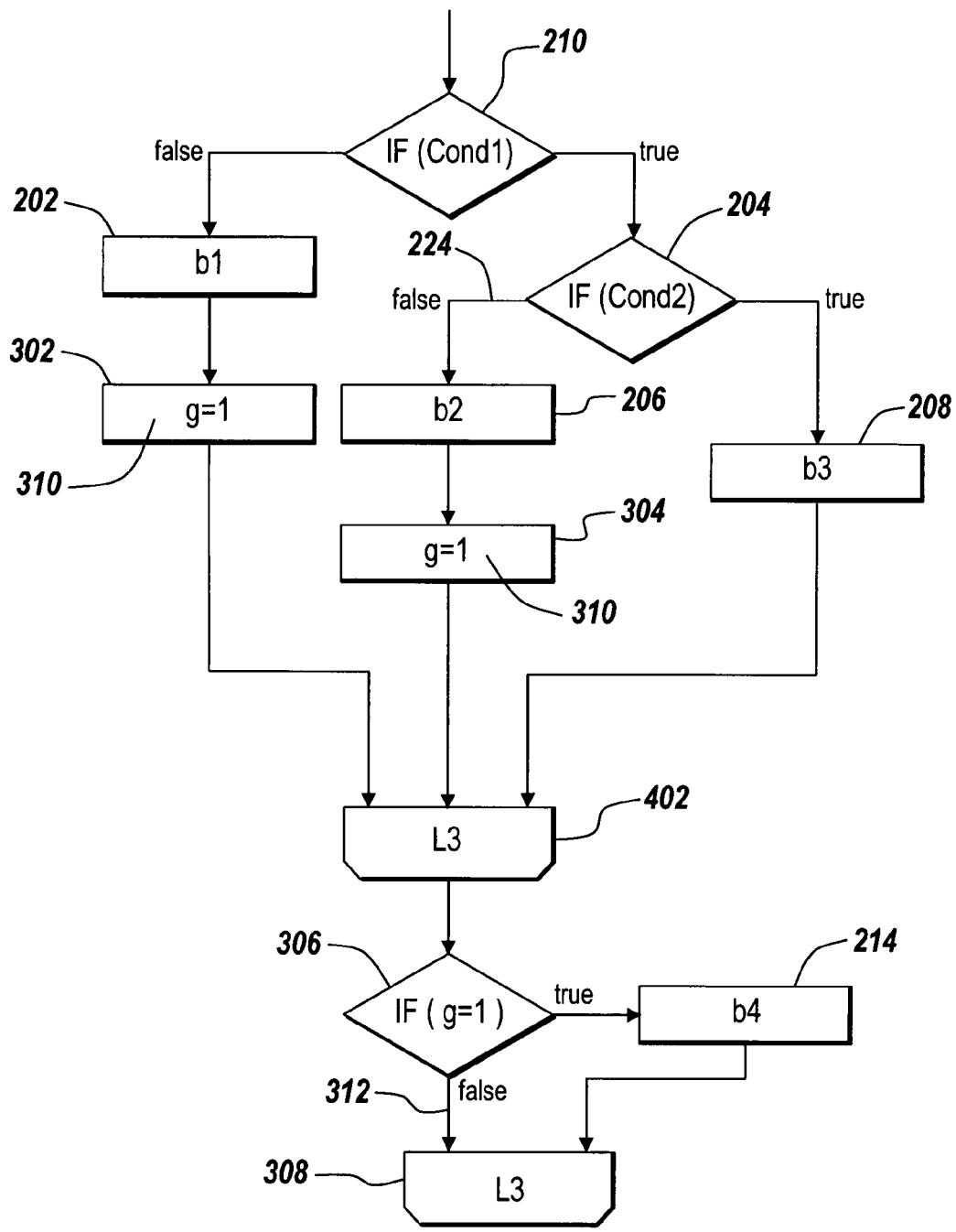
FIGS. 4A-C are a schematic illustration of one of multiple possible reorganizations of the CFG of FIG. 3.
Figure 4B:
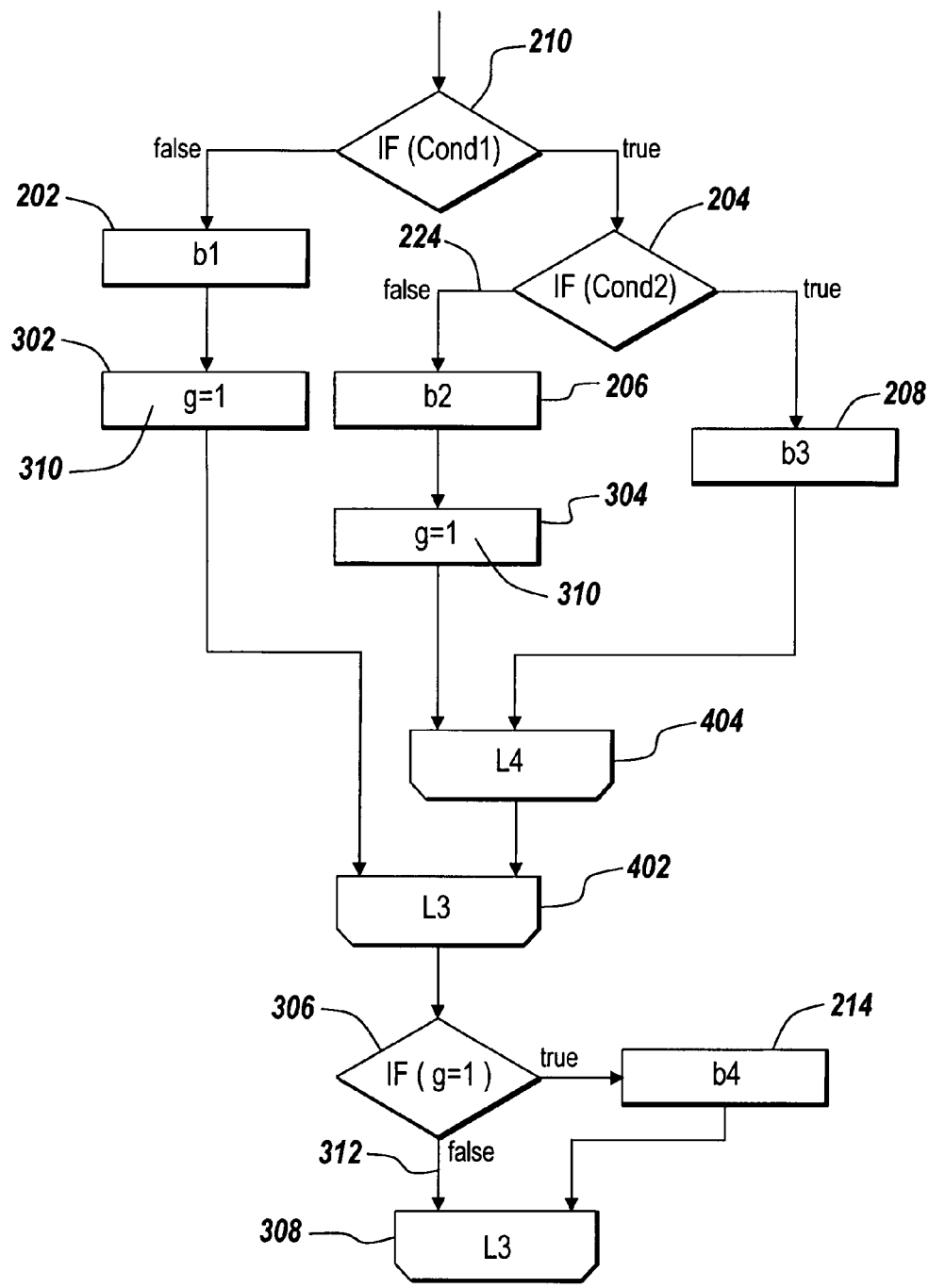
Figure 4C:
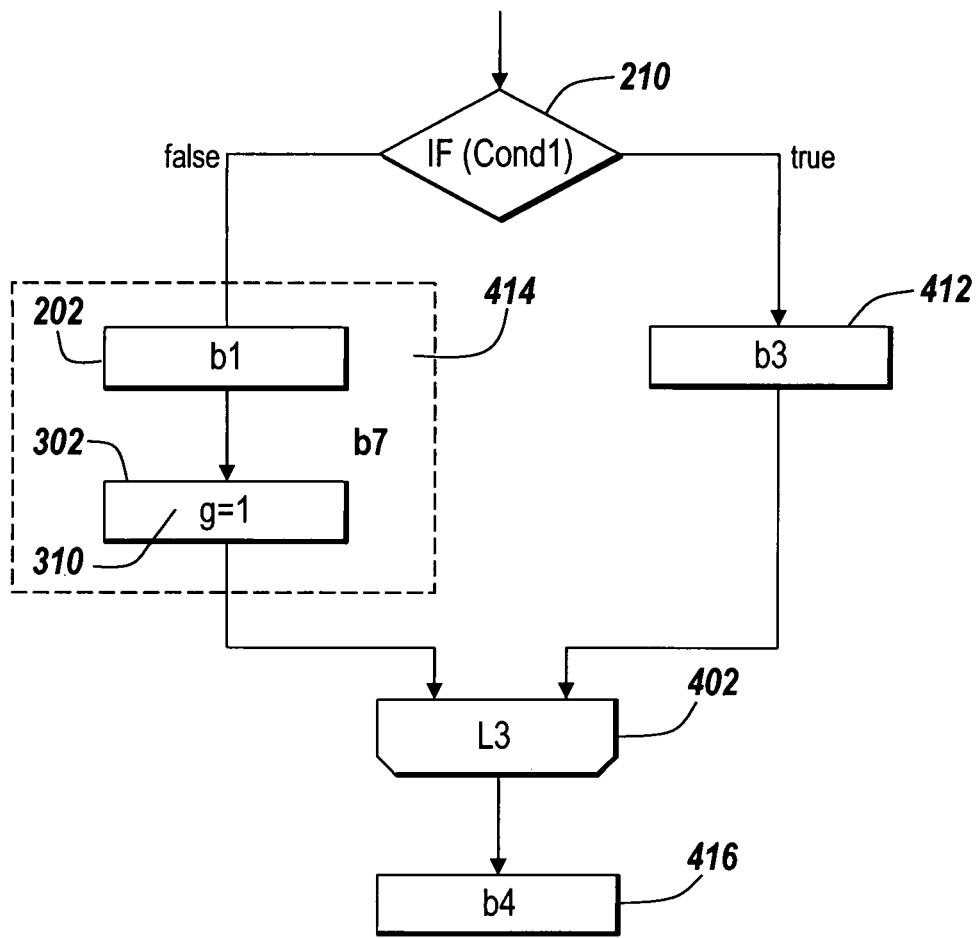

FIGS. 4A-C illustrate one of multiple possible reorganizations of the CFG of FIG. 3. In FIG. 4A, MERGE nodes 212 and 216 have been combined into one MERGE node 402. In one embodiment of the invention, MERGE node 402 may then be split up into two nodes using, for example, principles of optimal merge splitting used in compilation and/or CFG analysis. In an alternative embodiment of the invention, the MERGE nodes may be split using some other principle or left with multiple inputs.

Illustrated in FIG. 4B is one possible split of MERGE node 402, into two MERGE nodes L4 404 and L5 406. In FIG. 4C, the region corresponding to TRUE test of Cond1 has been rewritten as a single SESE block b5 412. Blocks 202 and 302 may also be combined into a single SESE region b7 414. Likewise, another portion of the graph, which may be testing of the guard variable and/or executing block b4 214 can be viewed as another structured SESE region 416. It can be seen that the remaining CFG is now a structured non-trivial SESE region—that is, a structured SESE region that contains at least one SPLIT and at least one MERGE node. Code generated from this restructured CFG may now contain only IF/WHILE statements and no GOTO or similar flow of control modifying statements, and so it may be appropriate for HDL generation, standards compliance, or any other application, as deemed appropriate by one of skill in the art.

In one embodiment of the invention, identifying unstructured regions, restructuring them and then further reorganizing a CFG may be performed by one process. In alternative embodiments of the invention, these steps may be split up between different processes, be implemented differently than described herein or one or more of them may be omitted entirely.

Figure 5:
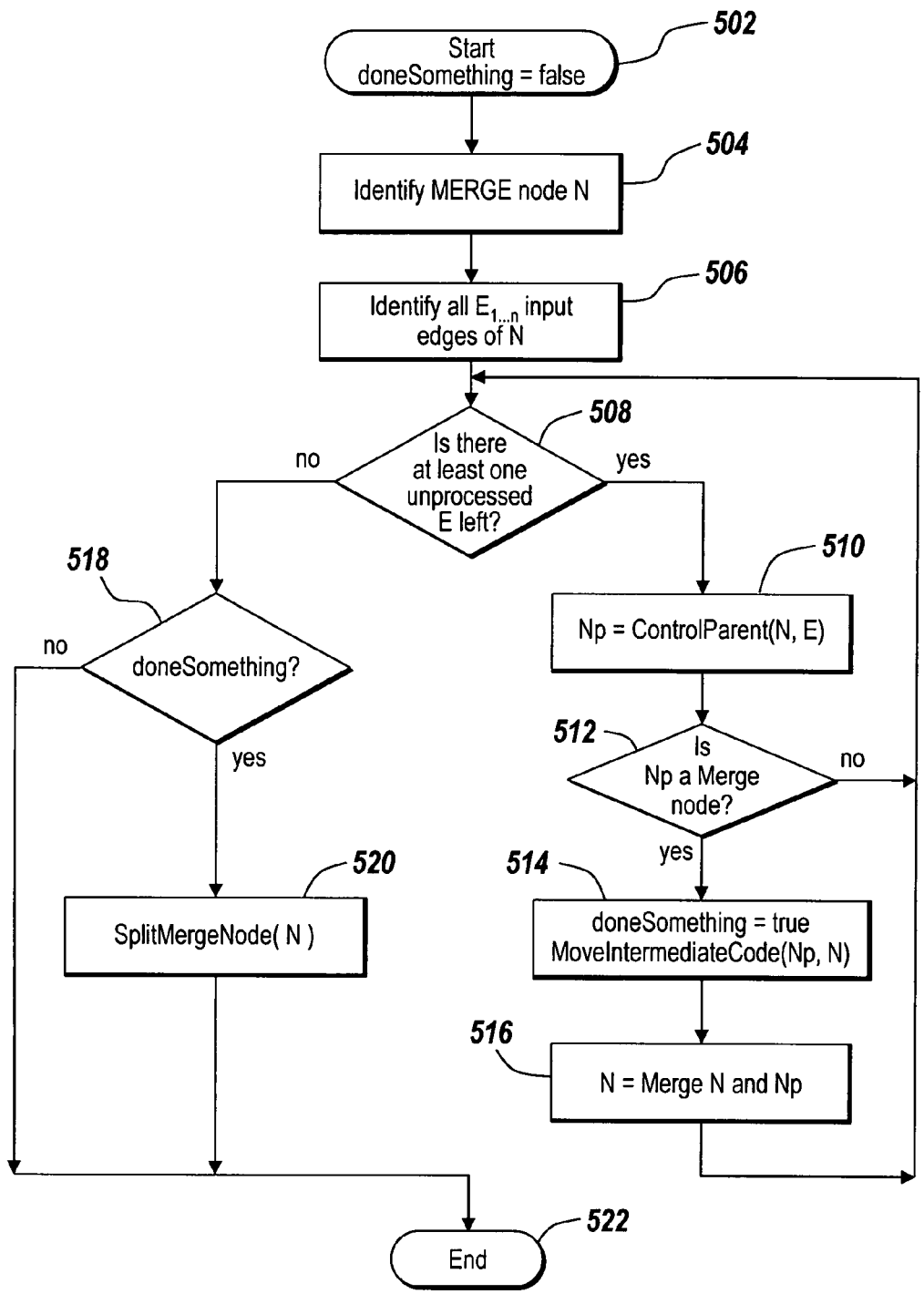
FIG. 5 is a flow chart illustrating CFG restructuring process according to one embodiment of the invention.

FIG. 5 is a flow chart illustrating CFG restructuring process according to another embodiment of the invention. In one embodiment of the invention, the process described herein in connection with FIGS. 5-8 may be used on any unstructured CFG, whether cyclic or acyclic. In an alternative embodiment of the invention, the process may be restricted to acyclic graphs. In yet another embodiment of the invention, additional restrictions may be imposed on a processed graph, while in alternative embodiments graphs may not have some of the features as graphs shown in illustrations herein. For example, while some embodiments of the invention are shown as having no multiple-input multiple-output nodes in a CFG, alternative embodiments of inventions may process multiple-input multiple-output nodes graphs as well. Yet other embodiments may process graphs with multiple-input single-output or single-input multiple-output nodes or may convert such graphs to a format similar to that of the graphs shown herein.

Referring to FIG. 5, CFG restructuring starts with identifying at least one MERGE node N (504), after which all of its edges are located (506). Edges E under consideration here are the ones leading to N, not the ones leading out of it. These edges may already be stored in a data structure, or may be identified through a graph search.

For each of the input edges E to node N (508), function ControlParent(N, E) is called and its result is assigned to a variable $N_p$. Function ControlParent(N, E) traverses the edge upwards to locate and return the next MERGE or SPLIT node. Function ControlParent(N, E) is further described below in connection with FIG. 6.

If identified node $N_p$ is a MERGE node (512), a flag is set, indicating that at least a portion of the graph has been restructured, and the code between two MERGE nodes is guarded and moved below the second MERGE node by a call to function MoveIntermediateCode($N_p$, N). MoveIntermediateCode($N_p$, N) sets a guard variable before the entry of the higher of the two MERGE nodes under consideration and pulls the code from between two MERGE nodes to below the lower one of them, properly guarding it by checking the guard variable. The guard variable may be initialized to a value different from the guard value before the entry to the unstructured region. It should be noted that the terms "higher," "above," "below," etc., are used herein in the sense of indicating relative position in the graph, regardless of how a graph is schematically drawn (or regardless of it being expressed textually). "Higher node" refers to a node whose exiting edges lead to a "lower node," where the lower node is located underneath, or downstream, from the higher node. After the code is moved, nodes N and $N_p$ may be merged (516) and the processing continues on other edges (508).

After all the edges have been processed, it may be useful to check whether any restructuring has been performed (518) and, if so, to rearrange the graph through splitting or merging nodes, which may be accomplished, for example, by a call to function SplitMergeNode(N) (520, see FIG. 8), after which the processing may be complete (522), or, alternatively, it may proceed to on other merge nodes. Each time the graph is reorganized by compacting the bottom-most MERGE node with the upstream nodes between the bottom-most MERGE node and the entry node, the region decreases by a finite amount. Eventually, processing may terminate when the bottom MERGE node is connected directly to the entry node via SESE regions. In alternative embodiments, it may not be possible to achieve such complete restructuring and processing may terminate when sufficient restructuring has been performed or when a predetermined number of regions have been moved, or on a time basis, or based on other limitations, as deemed appropriate by one of skill in the art. A user may determine what constitutes sufficient restructuring.

In one exemplary embodiment, CFG restructuring may be expressed in pseudo-code as:
ConvertToStructuredRegion(Node N)
Require: N has to be a merge node
1: while 1 do
2: doneSomething←False
3: for all E←Input Edge of N do
4: Node Np←ControlParent(N, E)
5: if Np is a merge node then
6: doneSomething←True
7: MoveIntermediateCode(Np, N)
8: N←Merge N and Np
9: end if
10: end for
11: if doneSomething then
12: SplitMergeNode(N)
13: else
14: break from loop
15: end if
16: end while The execution of the restructuring process is not limited to following steps outlined above, and may be performed using any number of different techniques, as will be apparent to one of skill in the art. Actions need not be performed in the same order as described and may be substituted by functionally equivalent or similar actions.

Figure 6:
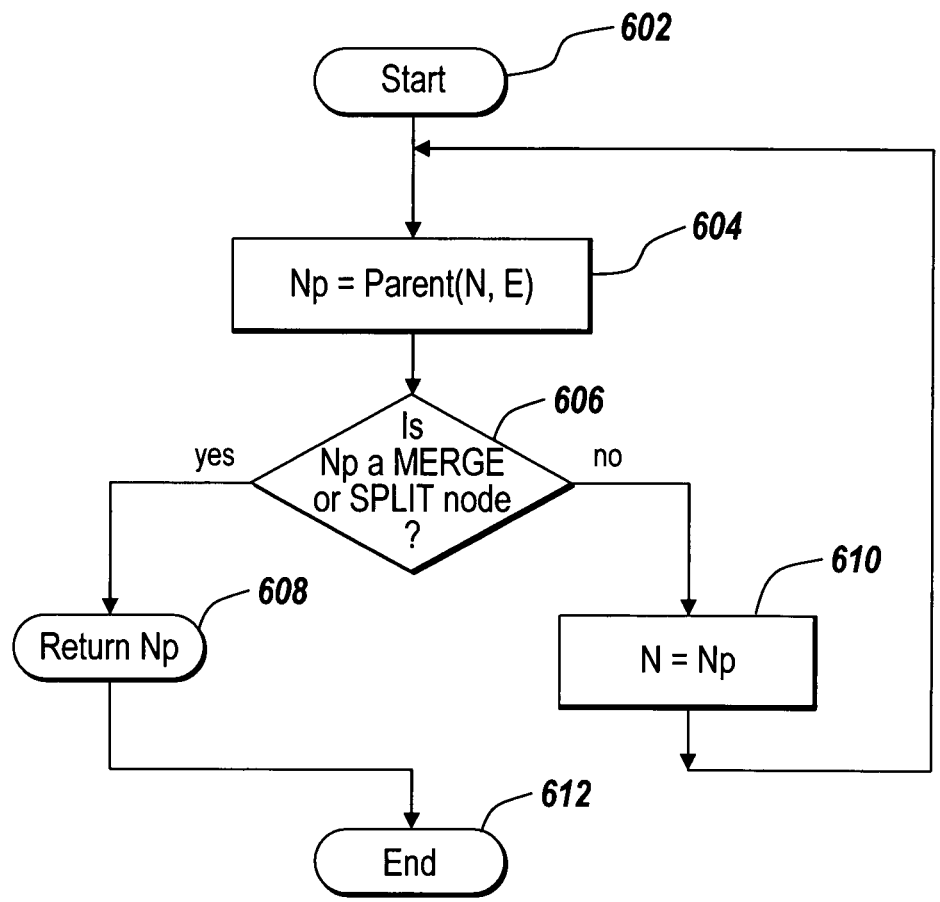
FIG. 6 is a flow chart illustrating processing of function ControlParent(node N, edge E)

FIG. 6 is a flow chart illustrating processing of function ControlParent(node N, edge E). This function, after its start (602), traverses edge E upwards through all nodes (604), skipping all intervening SESE regions (606 and 610), until it arrives at a MERGE or a SPLIT node (606 and 610). The return value is the node Np found (608).

Figure 7:
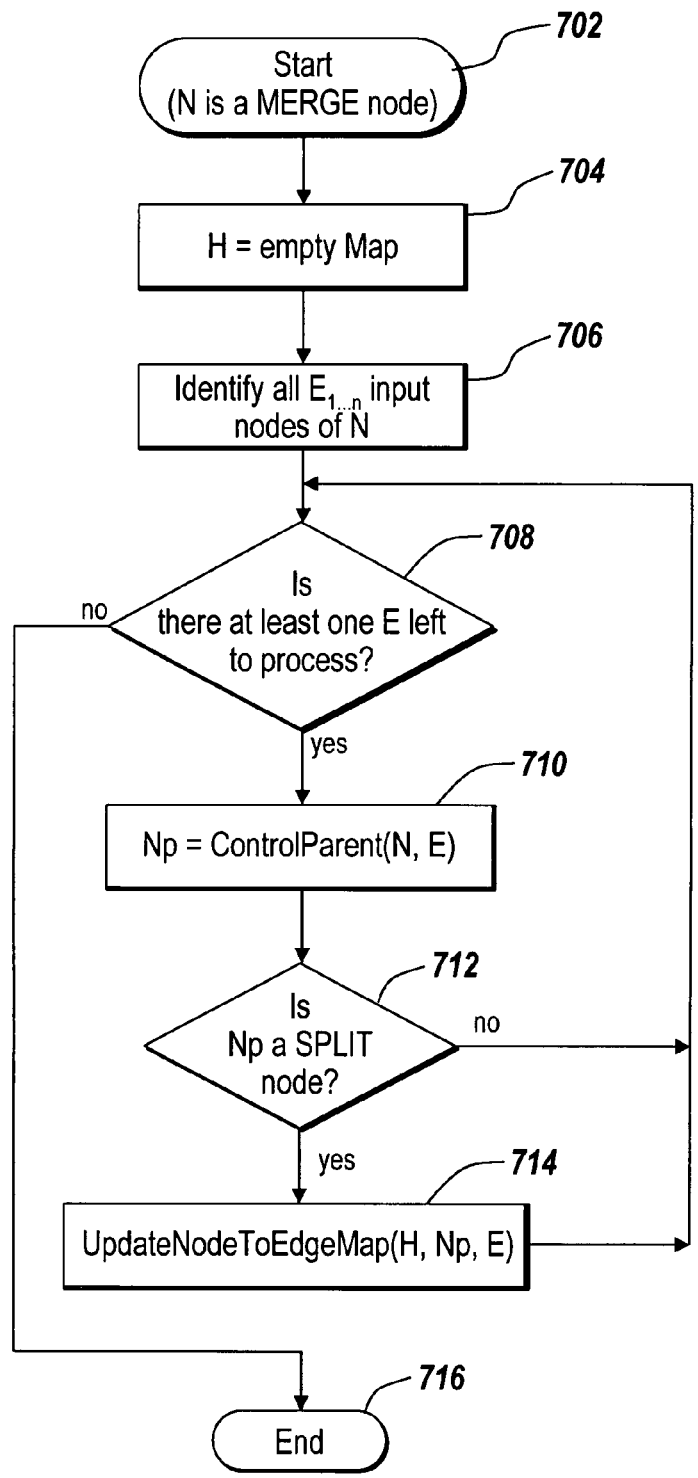
FIG. 7 is a flow chart illustrating processing of function SplitMergeNode(node N)

FIG. 7 is a flow chart illustrating processing of function SplitMergeNode(node N). SplitMergeNode "splits" a given MERGE node N (702) into multiple MERGE nodes such that the number of final input edges reaching the bottom-most MERGE node is minimized. In other words, it maximizes the number of SESE regions formed from edges coming into the bottom MERGE node. Splitting may be performed by various approaches, not necessarily using the one described herein.

Figure 8:
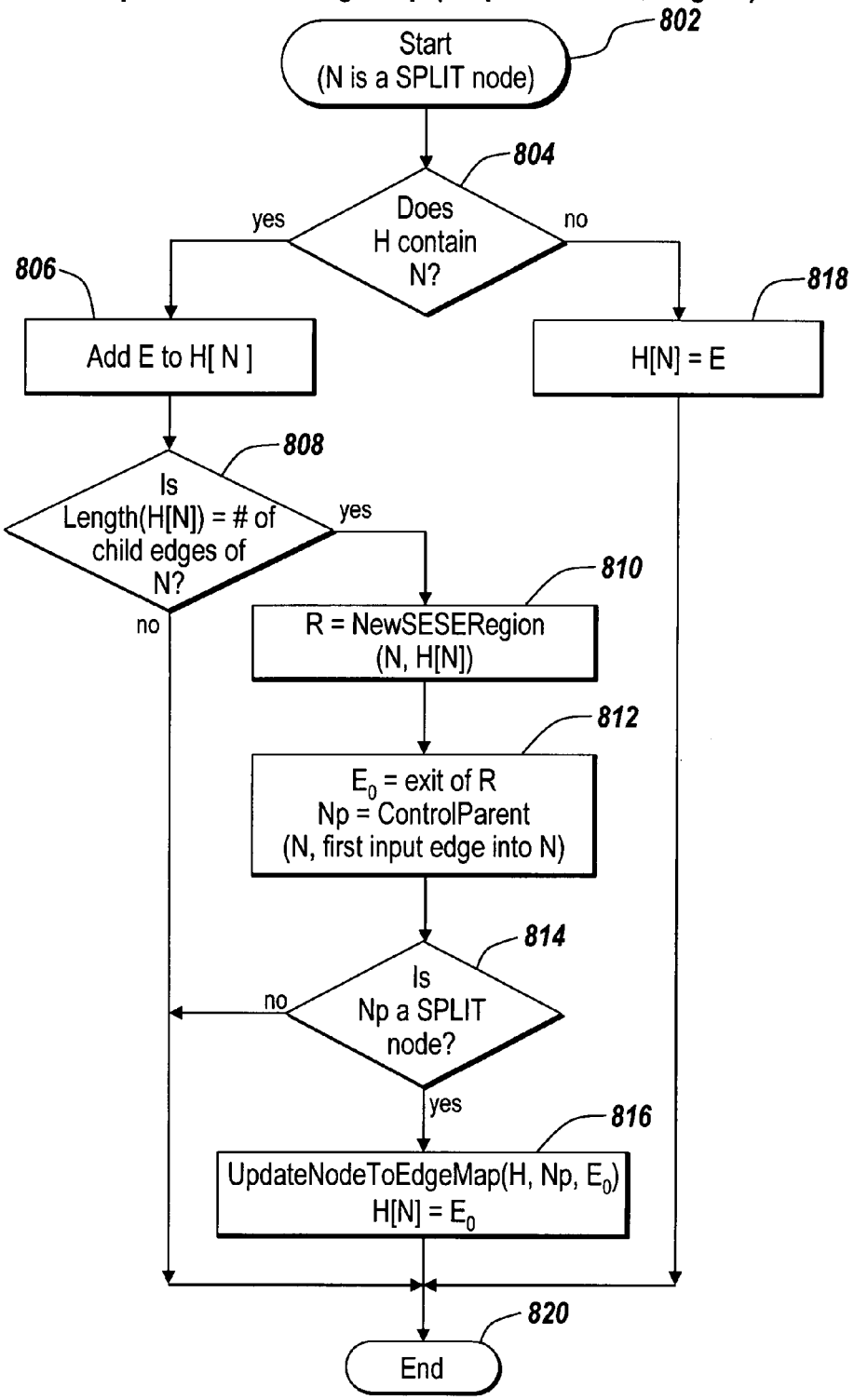
FIG. 8 is a flow chart illustrating function UpdateNodeToEdgeMap (map H, node N, edge E)

At the beginning of processing, variable H is set to be an empty map (704), after which all input edges E to MERGE node N are identified (706). Processing proceeds on each of the identified edges E (708), by calling ControlParent(N, E) (710) and checking whether resulting Np is a SPLIT node (712). If it is, the graph is updated in a call to UpdateNodeToEdgeMap(H, Np, E) (714), otherwise the processing proceeds to the next input edge (708), until all edges have been considered (716). Functionality of SplitMergeNode(N) may be alternatively described with the following pseudo-code:
SplitMergeNode(Node N)
Require: N has to be a merge node
1: H←empty map
2: for all Input edge E incident on N do
3: Np←ControlParent(N, E)
4: if Np is a split node then
5: UpdateNodeToEdgeMap(H, Np, E)
6: end if
7: end for FIG. 8 is a flow chart illustrating function UpdateNodeToEdgeMap (map H, node N, edge E). This function assumes (or checks) that N is a SPLIT node (802). If map H already contains N (804), edge E is added to H[N]—map H of N (806), otherwise H[N] is replaced with E (818). After adding E to H[N], the process checks whether the length of H[N] is equal to the number of child edges of N (808), and, if it is, region R is set to be a new SESE region by calling function NewSESERegion(N, H[N]).

Figure 9C:
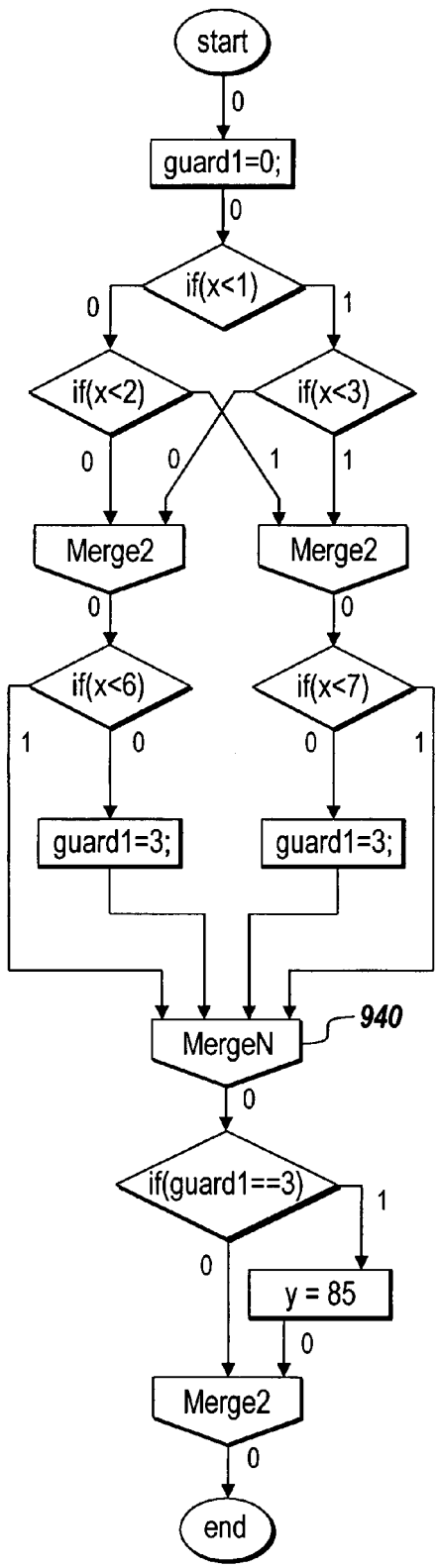
Figure 9D:
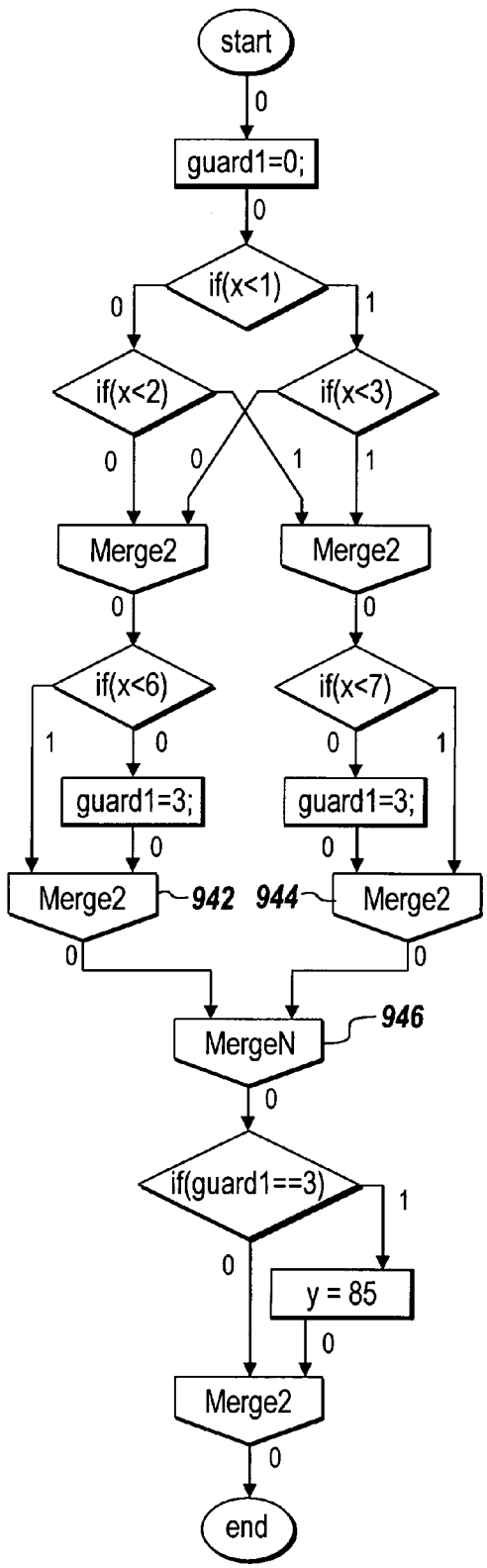

When the new SESE region is formed, Eo is set to be its exit edge and Np is set to be the result of ControlParent(N, First input edge into N) (812). If Np is a SPLIT node (814), the function UpdateNodeToEdgeMap is called recursively and H[N] is set to Eo (816). The function UpdateNodeToEdgeMap essentially takes in a node and a list of its child edges and forms a SESE region by merging the edges together into a single merge node. Functionality of UpdateNodeToEdgeMap may be alternatively described with the following pseudo-code:
UpdateNodeToEdgeMap(Map H, Node N, Edge E)
Require: Map H mapping split node N to list of child edges Ei of N
Require: N has to be a split node
1: if H contains key N then
2: Add E to H[N]
3: if Length(H[N])==Number of child edges of N then
4: R←NewSeseRegion(N, H[N])
5: Eo←exit of R
6: Np←ControlParent(N, First input edge into N)
7: if Np is a split node then
8: UpdateNodeToEdgeMap(H, Np, Eo)
9: Replace edges H[N] going into N with single edge Eo
10: end if
11: end if
12: else
13: H[N]←E
14: end if Operation of the above-described functions of one embodiment of the invention may be further illustrated in connection with FIGS. 9A-D and 10A-C. Shown in FIG. 9A is a control flow graph with multiple unstructured regions (926, 928). In FIG. 9A, notation MergeN is used to indicate a MERGE node having more than two inputs and Merge2 is used to indicate a MERGE node with two inputs. "0" or "1" next to an arrow indicate whether that edge is taken when the result of a condition is true ("1") or false ("0").

In one embodiment, processing starts from the first MERGE node from the bottom—that is, node 922 in this case. Following the flowcharts shown above, next MERGE node is located (918) and the region including them may be determined to be unstructured, because there is a code block (920) in between the two MERGE nodes.

Code block 920 may then be guarded with a guard variable "guard1," initialized to zero at the entry to the CFG (934, see FIG. 9B) and set on two paths to node Merge2 918 (936 and 938). The check of the guard variable is introduced below node MergeN 922 (nodes 930, 920 and 932).

FIG. 9C illustrates merging of two MERGE nodes, without a code block in between. A new MERGE node—node 940 is formed. That node is then split into two using optimal merge splitting (see FIG. 9D, nodes 942, 944 and 946). Region 928 has now been rewritten into a structured region.

Figure 10A:
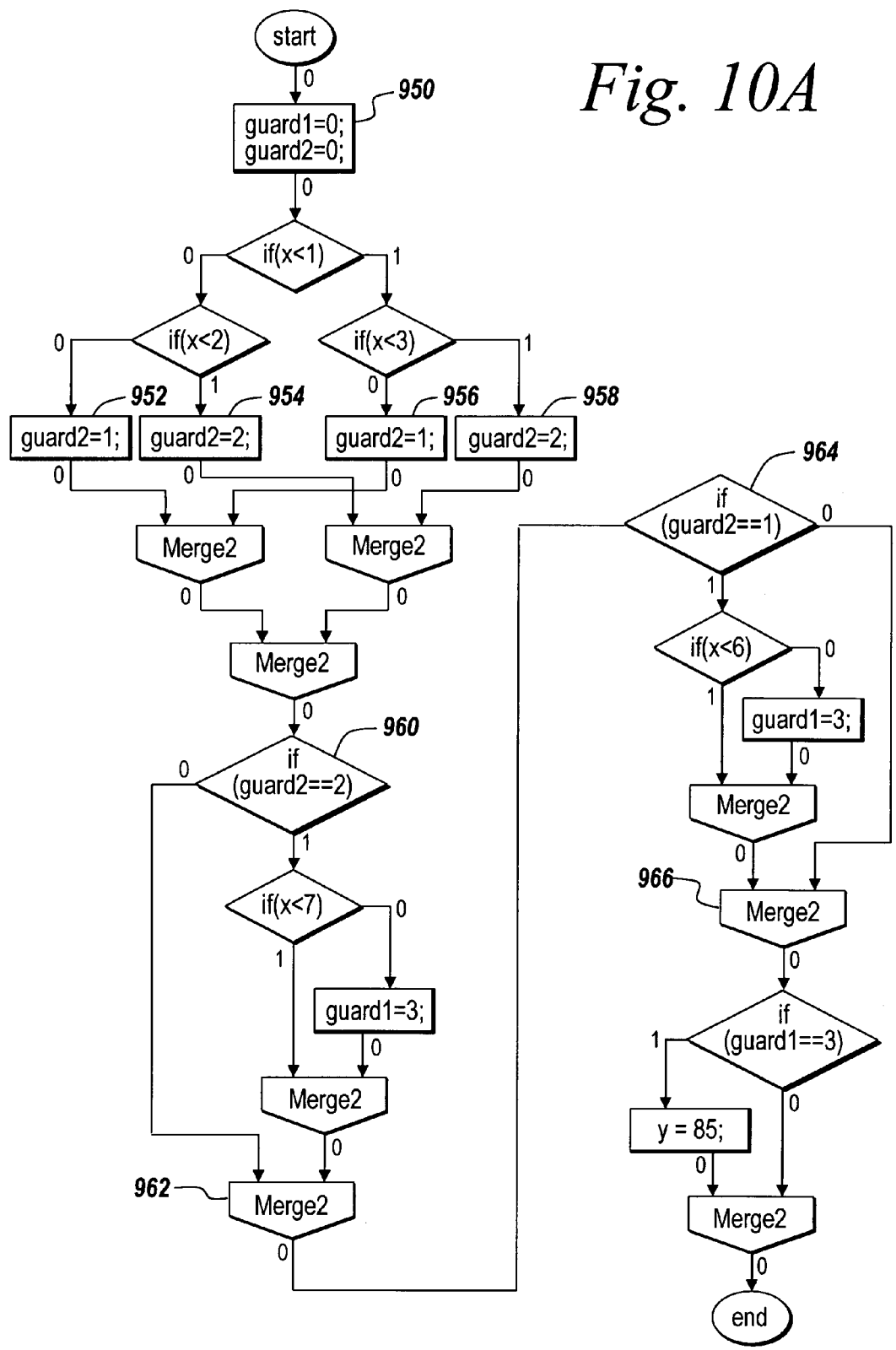
FIGS. 10A-C are schematic illustrations of additional possible reorganizations of the CFG of FIGS. 9A-D.
Figure 10B:
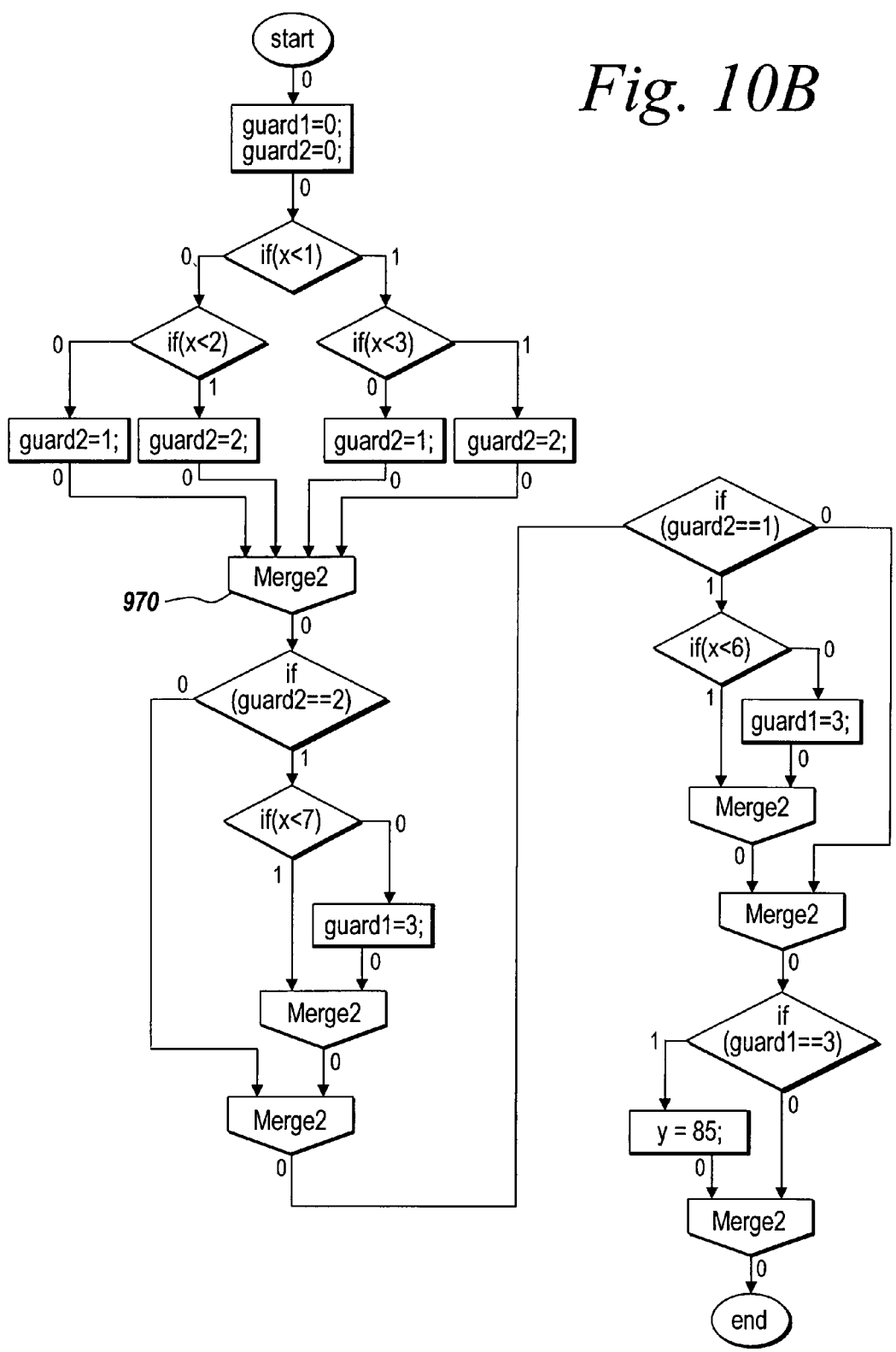
Figure 10C:
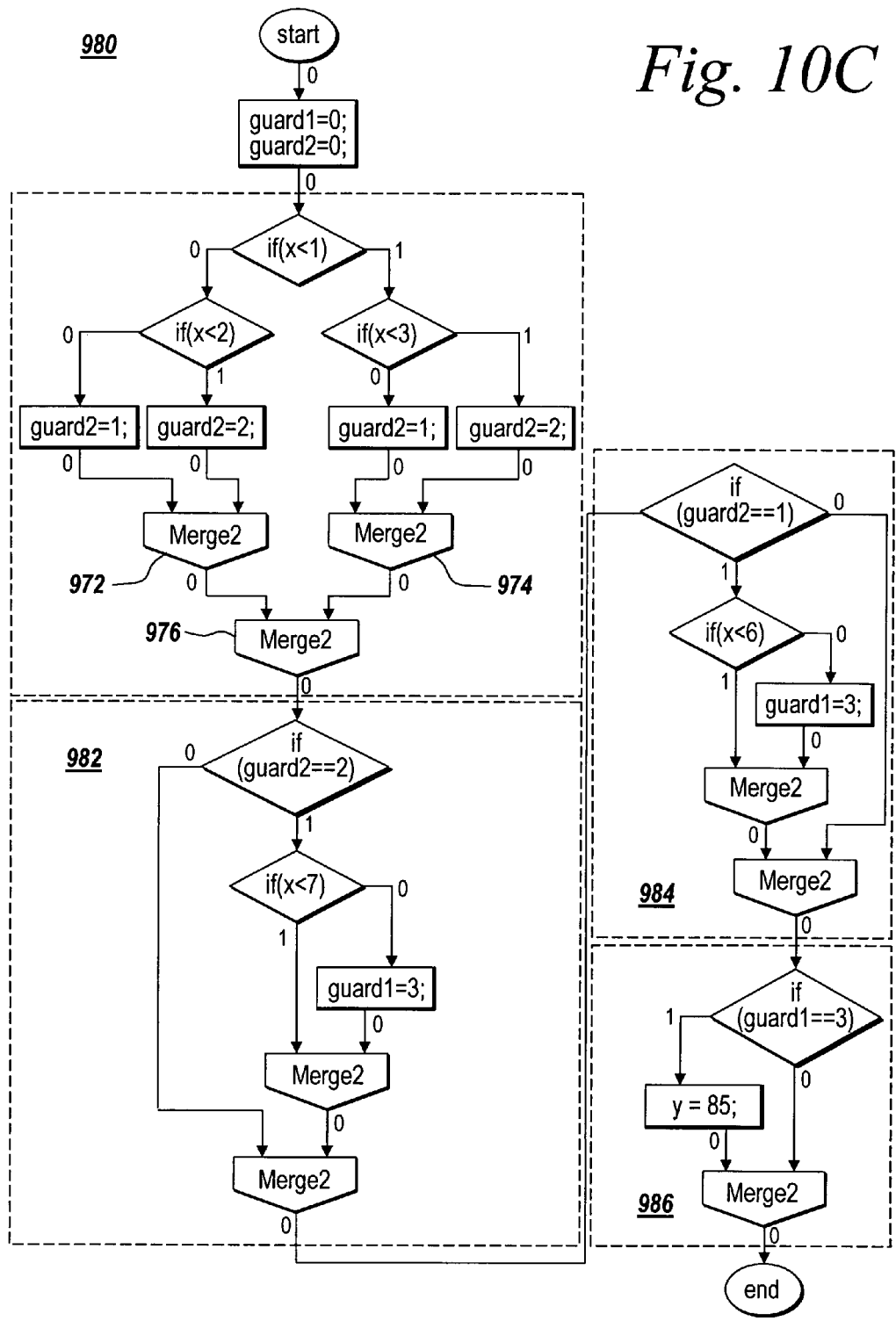

Illustrated in FIGS. 10A-C are further transformations that may be performed on the CFG of FIG. 9A. The next two MERGE nodes (910 and 912) may now be reached and the regions between them and Merge2 918 converted to a structured one. Guard variable "guard2" is introduced (950) and is set to different values, depending on the path to the MERGE nodes (see nodes 952, 954, 956, and 958). Code blocks are guarded using "guard2" guard variable (blocks from 964 to 966).

Two MERGE nodes may now be combined into one (FIG. 10B, node 970) and split again (972, 974 and 976). At this point, the graph consists of at least four SESE regions (980, 982, 984 and 986) and no unstructured elements. Code generated from it may be free from GOTO-like constructs. Alternatively, it may be possible to generate a HDL representation from this graph, because it is possible to represent this graph using IF/ELSE and SWITCH constructs, both present in HDL.

Although shown above are acyclic CFGs, some embodiments may be applicable to cyclic CFGs. In one embodiment of the invention, cyclic CFGs need not be identified beforehand, which may reduce processing time, and the process of identifying and structuring unstructured regions may proceed on cyclical CFGs as described above. In an alternative embodiment, different approaches may be taken with CFGs containing loops. In one embodiment, restructuring of cyclical CFGs may involve additional actions, such as, for example, those described below in connection with FIGS. 14-20. Such processing may be aimed at simplifying or structuring some or all of the cycles in a CFG, or may include other processing.

Various optimization, compilation and/or static analysis schemes may be applied to a CFG before, during or after processing it to structure the unstructured regions. Some embodiments of the invention may benefit from code or graph optimization techniques as known in the art or as designed by one of skill in the art.

In alternative embodiments, a CFG may be rewritten into a different representation prior, during or after identification of unstructured regions or processing unstructured regions into structured ones. In yet other embodiments, code generated from a CFG after restructuring may be in any of the industry-known or custom-designed textual or graphical languages, such as, for example C, Object C, C++, C#, Assembly, Java, Java bytecode, Javescript, VHDL, Verilog, Perl, Python, programmable logic controller (PLC) programming languages, languages such as Structured Text, etc. Examples of PLC programming languages may be languages supporting the IEC 1131-3 standard, including Structured Text (ST) and Instruction List (IL). In addition, alternative embodiments may apply to UML- or UML-derivatives-based models.

A CFG may initially be generated from any of textual and/or graphical languages, including, but not limited to, array-based languages, dynamically typed languages, statically typed languages, etc. One applicable array-based language may be a language a subset of which is compatible with a MATLAB® programming environment.

Figure 11:
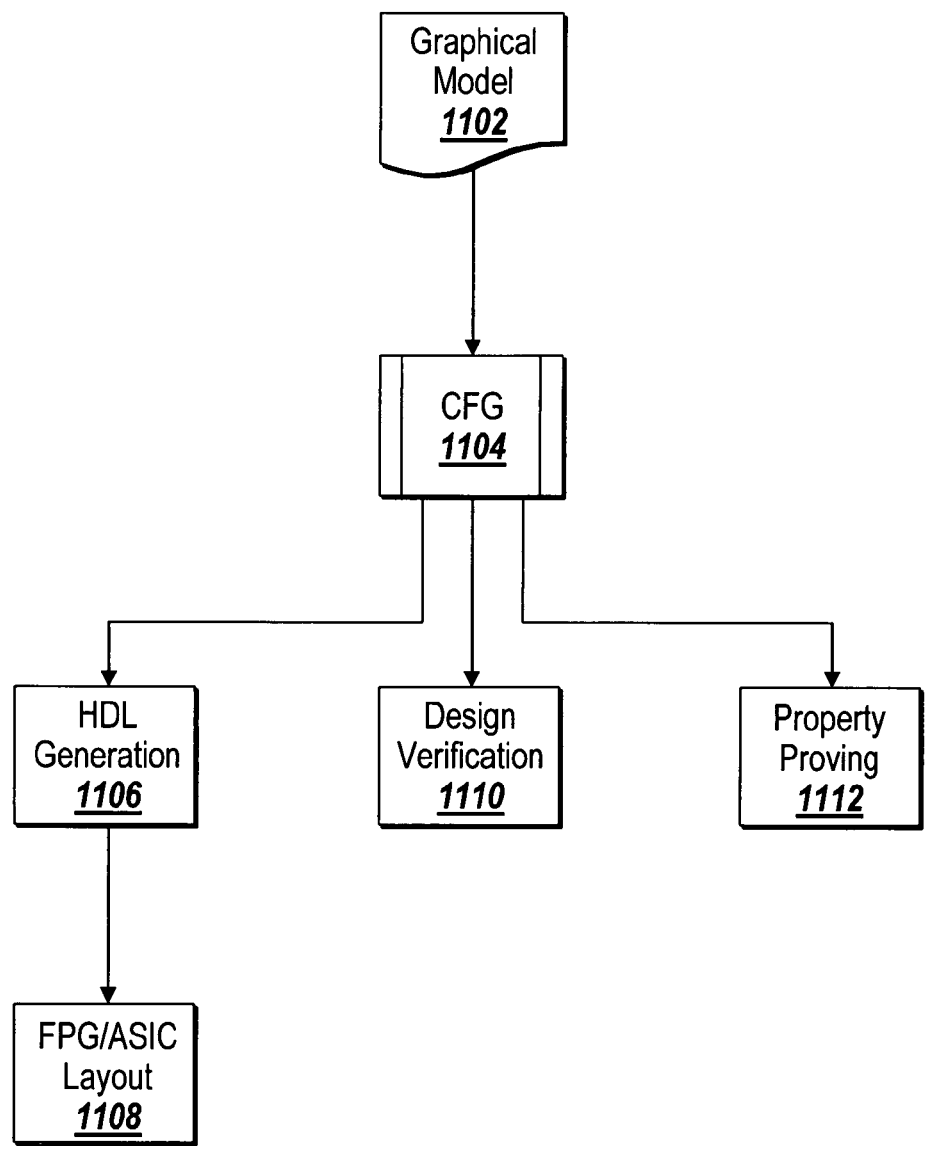
FIG. 11 is a schematic illustration of some of the possible uses of restructured CFGs.

FIG. 11 is a schematic illustration of some of the possible uses of restructured CFGs. The illustrated uses may apply to cyclical and/or acyclical CFGs. A CFG may be generated from any number of textual and/or graphical models. As illustrated in FIG. 11, graphical model 1102 may be used as a source for a CFG, which is restructured to not contain unstructured regions (1104). The restructured CFG may be put to one or more of a number of uses. For example, the restructured CFG may be used to generate hardware layout by means of, for example a HDL representation such as Verilog and VHDL (1106), which may be used to generate FPGA or ASIC layout (1108), and general layout and/or organization of custom-made silicon hardware designs. The restructured CFG may also be used for model verification (1110) and model property proving (1112).

In an alternative embodiment of the invention, the generated hardware layout may itself be simulated in Simulink® modeling environment or any other modeling environment. In yet another embodiment of the invention, a restructured CFG or the process of restructuring may be used to make decisions about hardware-vs-software trade-offs. That is, parts of the generated code may be designated as best implemented in software, while other parts may be designated for hardware implementation; and hardware layout may be generated for those parts.

Figure 12A:
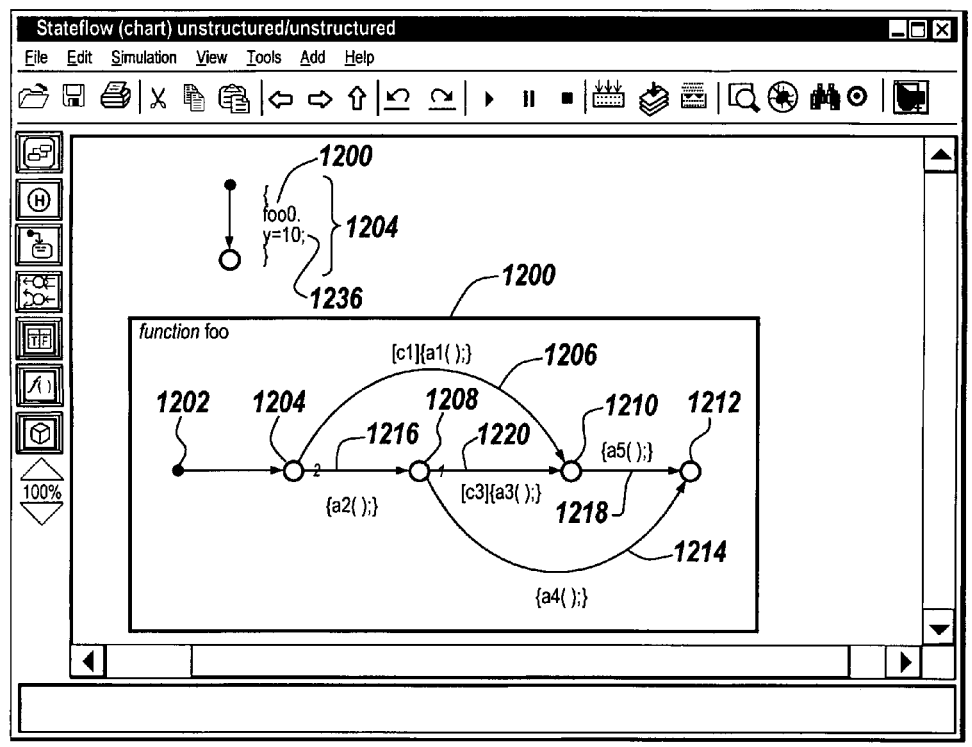

Shown in FIG. 12A is simple model 1201 in the Stateflow® modeling environment. As part of the transition from one state to another, model 1201 calls function foo( ) 1200. Function 1200 itself is a relatively simple model with states 1202, 1204, 1208, 1210, and 1212 and transitions between them, as shown. Transitions 1206 and 1216 from state 1204 are chosen based on the value of variable c1, and transitions 1220 and 1214 from state 1208 are chosen based on the value of variable c3.

Figure 12B:
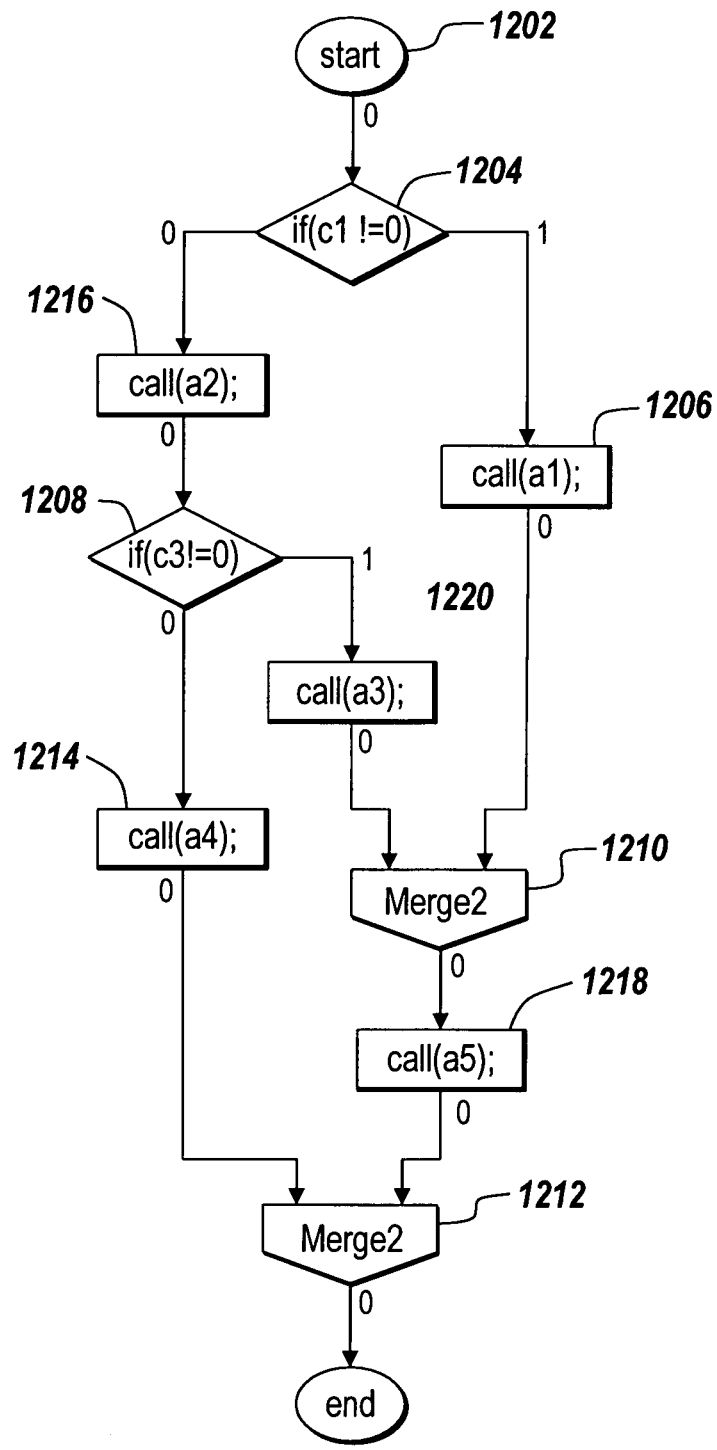

The control flow graph for model 1200 is shown in FIG. 12B. States are labeled with the same numbers as in FIG. 12A where appropriate for ease of reference. Using the definition for finding unstructured regions above, it is possible to locate block 1218, located between two MERGE blocks 1210 and 1212. Referring now to FIG. 12C, it can be seen that this region indeed results in an unstructured code employing a GOTO statement (1232). Lines in FIG. 13C are labeled with similar numbers to FIGS. 12A and 12B where possible for ease of reference.

Figure 13A:
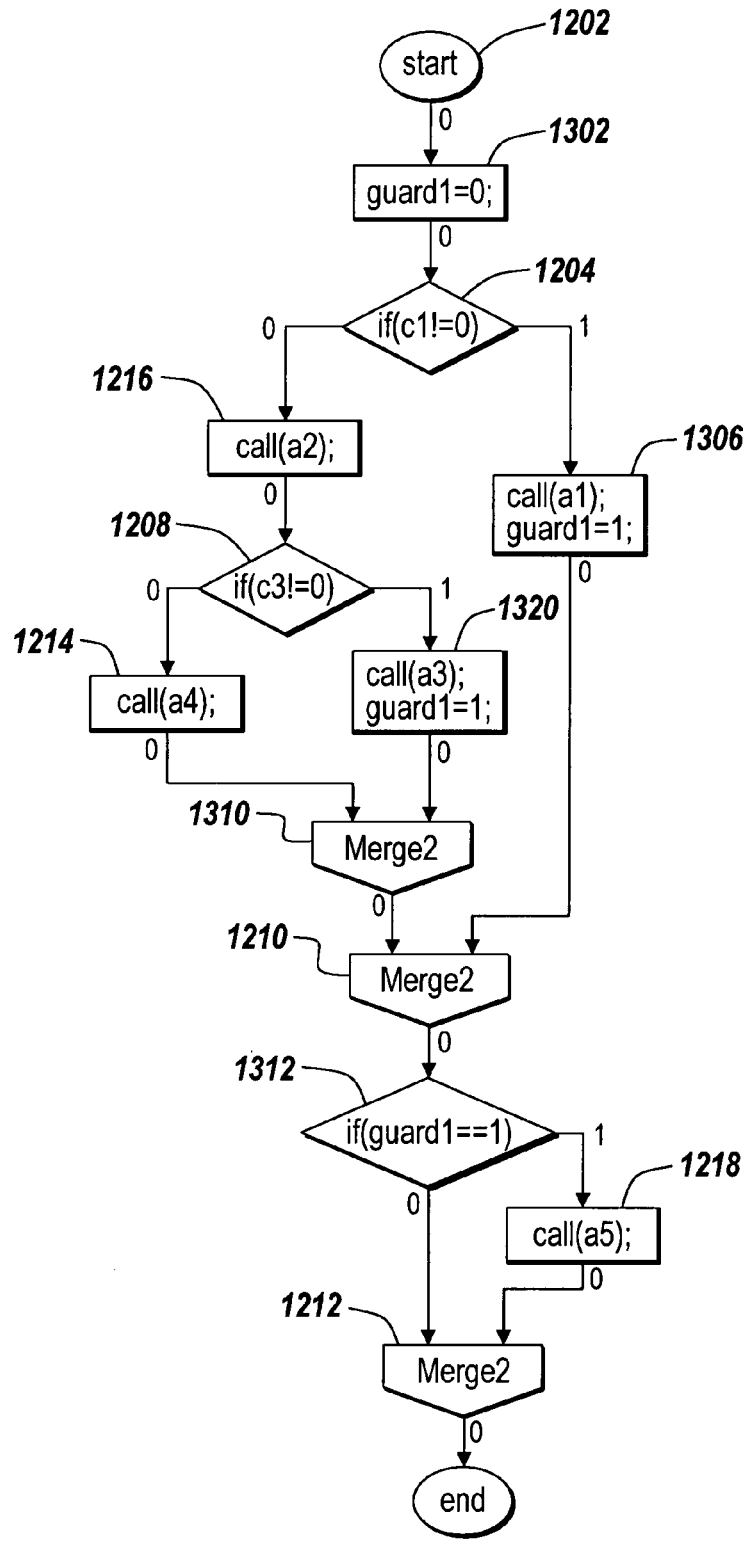

FIG. 13A is an illustration of the CFG of FIG. 12B after restructuring. Guard variable guard1 has been introduced and is initiated in block 1302. It is set to 1 on all paths that previously led to block 1218—namely, in blocks 1306 and 1320. The execution of block 1218 is now surrounded by the test of the guard variable (1312). No unstructured regions remain in the CFG, because blocks 1210, 1312, 1218, and 1212 may together be viewed as a single SESE region. FIG.

13B shows generated code corresponding to the CFG of FIG. 13A. There are no more GOTO or GOTO-like statements in the code. Instead, statements declaring and the guard variable (1302), setting it to a particular value (1306 and 1320) and testing it (1312) have been introduced, and command 1218 is executed within the IF block (1312).

In a similar manner, many models, both from the Stateflow® and other modeling environments may be used to generate structured code, where previously the generated code would have been unstructured. The resulting structured code may be used for many purposes and applications, as discussed above.

FIGS. 14-20 address cycle restructuring—that is, reconfiguring a CFG in such a way as to create structured or semi-structured loops out of unstructured loops. An unstructured loop is a loop that cannot be expressed only in WHILE-like loop constructs and requires at least one GOTO-like construct in the generated code.

Figure 14:
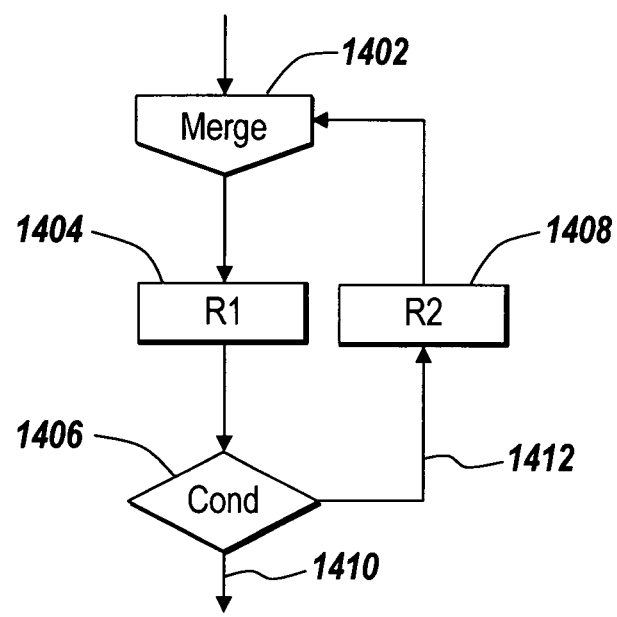
FIG. 14 illustrates one example of unstructured cyclical CFG region.

FIG. 14 illustrates one example of unstructured cyclical CFG region. The region has one entry node—MERGE node 1402—and one exit node—CONDITION node 1406—and only two SESE code regions inside the loop body: region R1 14004 and region R2 1408. However, one possible representation of the code generated from this CFG may be expressed as following:

```
while(true) {
  R1;
  if (cond==true) {
    break;
  }
  else {
    R2;
  }
}
```

The BREAK command is a GOTO-like construct, which indicates the presence of unstructured regions in the loop. One of the goals of loop restructuring may be to reposition nodes within a cyclical CFG in such a way as to create structured loops, containing SESE CFG code regions either between an entry node and an exit node (nodes 1402 and 1410 in this example) or between the exit node and the entry node, but not in both direction. If the CFG of FIG. 14 lacked either region R1 1404 or region R2 1408, the cycle would be structured, as shown above in FIGS. 1C-D.

Figure 15A:
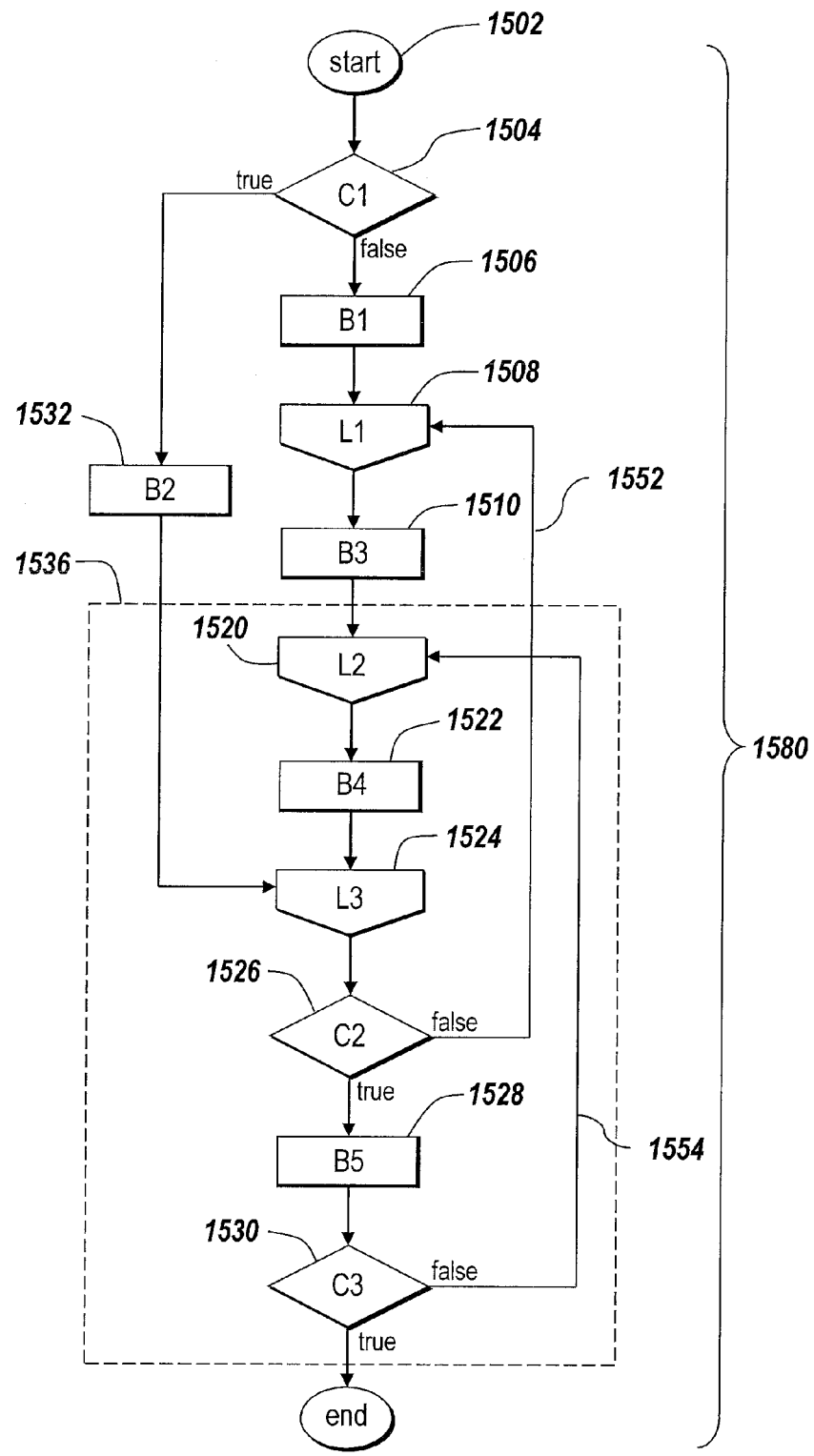
FIGS. 15A-B illustrate another unstructured cyclical CFG region.
Figure 15B:
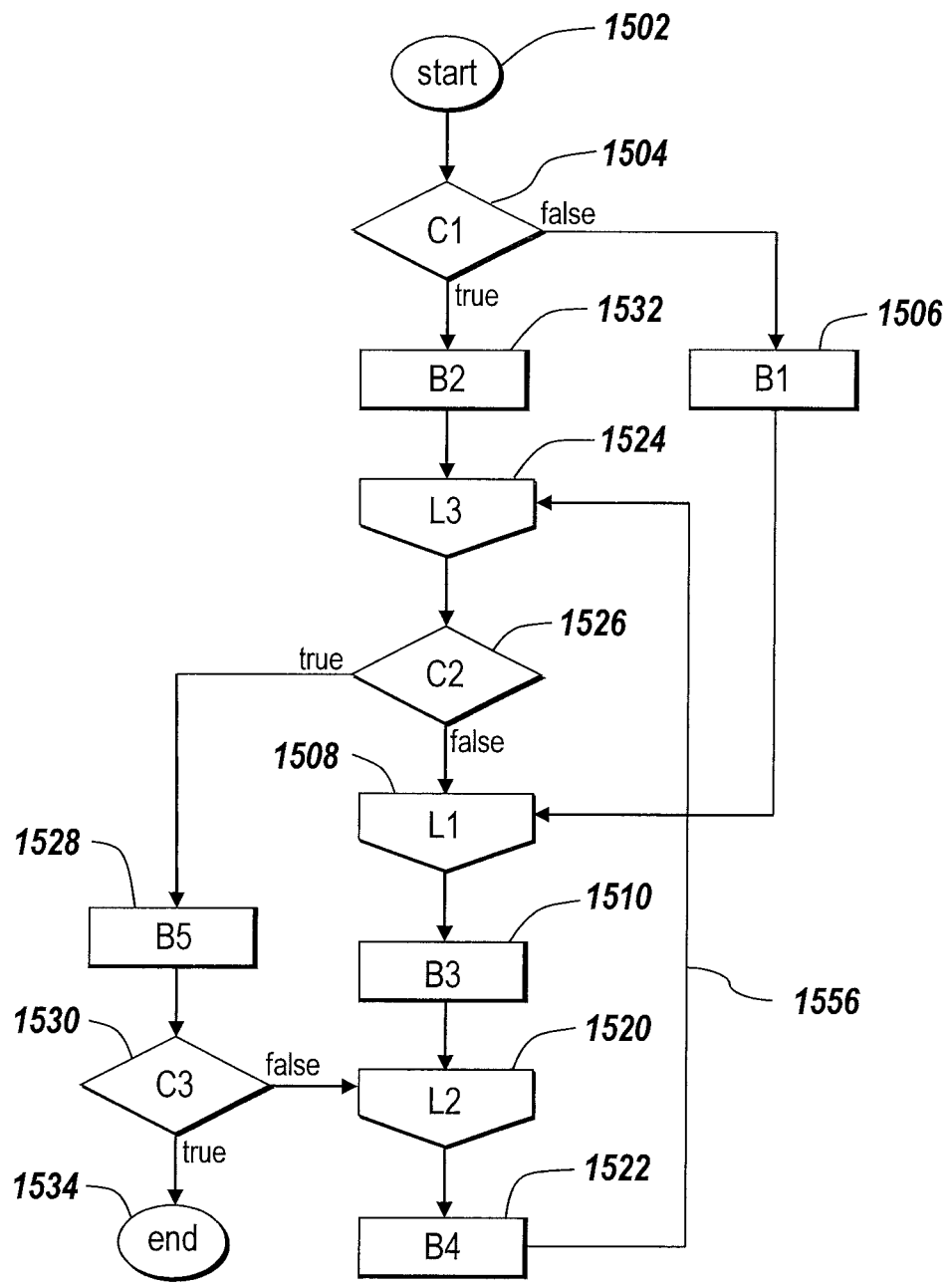

FIGS. 15A-B illustrate another unstructured cyclical CFG region. In the CFG of FIG. 15A, there are two backward edges (1552 and 1554), but that in itself may not always be an indication of the total number of loops in the CFG. For comparison, shown in FIG. 15B is a CFG the control flow of which is identical to that of FIG. 15A, yet with this layout there is only one back edge (1556). Like numbers are used for identification of like nodes for ease of inspection. As can be seen from this example, multiple different CFGs may be the same with the respect to their control flow. That is, code generated from such different CFGs will always produce the same result under the same conditions. In such a way, a restructured CFG region may look very different from the original region, while retaining the same functionality.

In one embodiment of the invention, it may not be necessary to determine an exact number of cycles in a particular CFG region before restructuring those one or more cycles into structured cyclical and/or acyclical regions. In an alternative embodiment, a CFG may be rearranged or its layout changed in any number of ways deemed appropriate by one of skill in the art, before, during or after the restructuring process, so long as the resulting CFG remains sufficiently functionally identical to the initial CFG. The sufficiency of the similarity between the original and the restructured CFG may be determined by one of skill in the art based on the requirements of the corresponding application.

CFG 1580 of FIG. 15A contains two CONDITION nodes (1504 and 1526), three merge nodes (1508, 1520, and 1524) and a number of SESE CFG regions (1506, 1510, 1522, 1528, and 1532). Code generated from CFG 1580 may contain multiple GOTO-like constructs and may pose a problem in terms of system proving or HDL generation.

One embodiment addresses restructuring CFG 1580 and other unstructured CFG regions in such a way as to produce structured nested and/or chained loops, which may even be abstracted as acyclical SESE regions. In an alternative embodiment, a complete restructuring may not be necessary, and a mere indication of some of the possible loops or abstract pseudo-nodes may be sufficient. A "pseudo-node" is a CFG node created from one or more CFG nodes, which serves as an abstraction for those nodes, even if it may not be properly created as a standard SESE node according to the graph rules.

FIGS. 16A-B and 17A-B illustrate possible abstracting of loops using pseudo-nodes based on CFG 1580 of FIG. 15A. Whenever possible, like numbers are used to indicate like elements in the shown CFG regions.

Figure 16A:
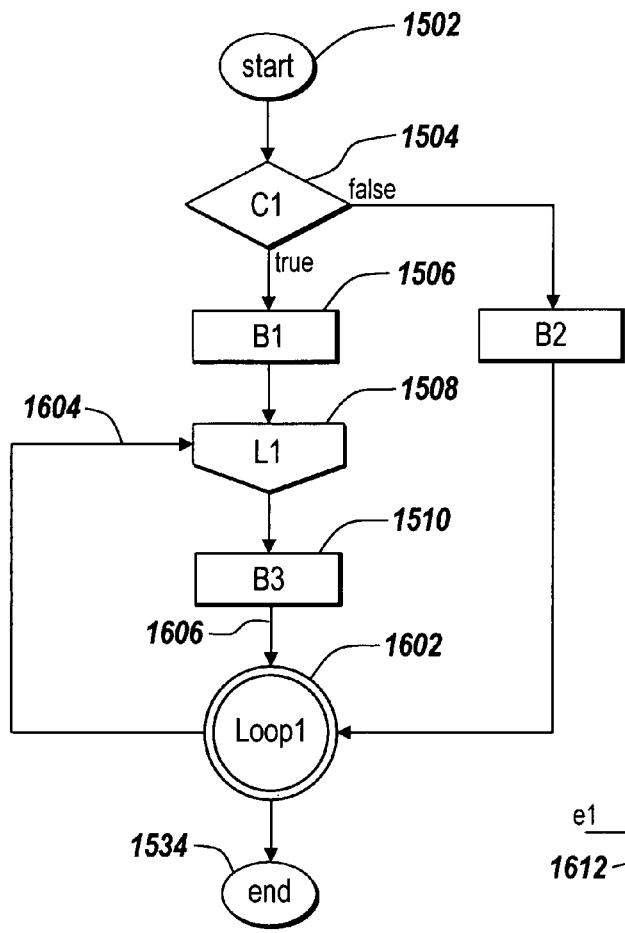
FIGS. 16A-B illustrate introduction of a loop node into the cyclical region of FIG. 15A.

Shown in FIG. 16A is a LOOP node loop1 1602. A LOOP node, as used herein, is a pseudo-node containing one or more CFG nodes. In one embodiment, inputs and outputs into a loop node reflect input and output edges into the nodes contained in the pseudo-node, and, even if not shown in the figures, information about the exact locations of input and output edges may be maintained along with the LOOP node abstraction. In an alternative embodiment, a different structure or construct may be used to represent multiple nodes. In yet another embodiment of the invention, the LOOP node may be unnecessary. Its presence in the shown control flow graphs may serve merely an explanatory purpose. In yet another embodiment, a LOOP or like node may be a temporary structure containing one or more nodes during CFG restructuring.

Figure 16B:
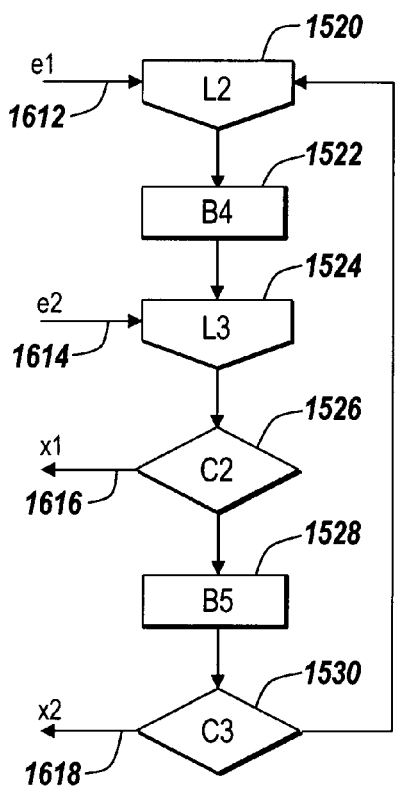

Loop1 node 1602 "contains" nodes L2 1520, B4 1522, L3 1524, C2 1526, b5 1528 and C1 1530. A loop node may be unlike other CFG nodes in that it may have multiple input and/or output edges. Loop1 node 1602 has input edges 1612 and 1614 and output edges 1616 and 1618, as illustrated in FIG. 16B. As seen in FIGS. 16A and 16B, the combination of the CFG of FIG. 16A and the contents of loop1 node 1602 together constitute CFG 1580.

Figure 17A:
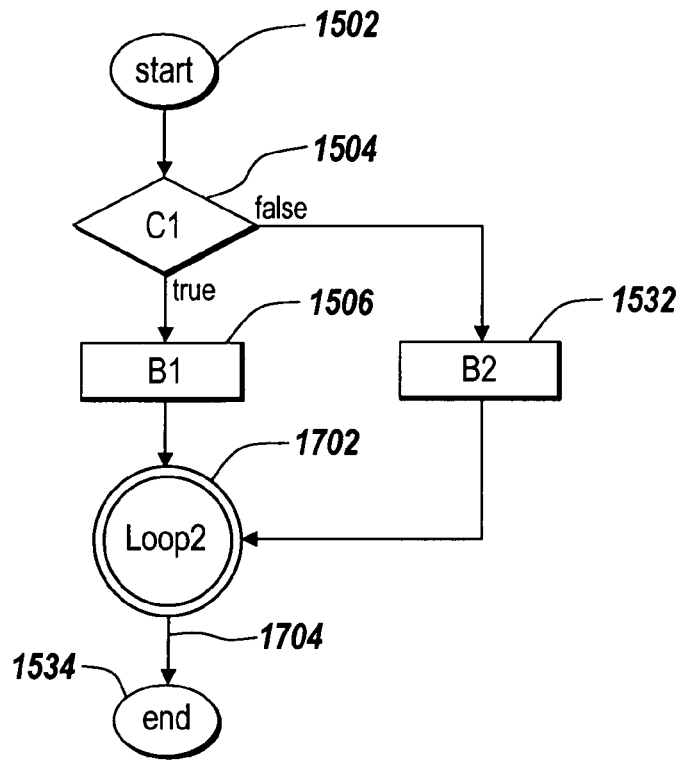
FIGS. 17A-B illustrate introduction of a second loop node into the cyclical region of FIG. 15A.
Figure 17B:
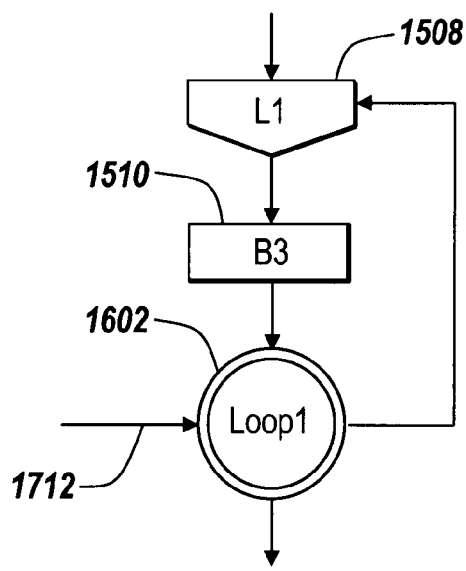

Further loop abstractions are possible, as shown in FIGS. 17A-B. Illustrated in FIG. 17A is a loop node loop2 1702. Preserved in loop2 node 1702 are nodes L1 1508, B3 1510, loop1 node 1602 (and all its contents) and their corresponding input and output edges. In one embodiment, the partitioning of nodes into successively larger pseudo-nodes is what constitutes cyclical CFG restructuring. In an alternative embodiment, additional processing may be necessary to account for multiple input and/or output edges and to produce structured code. In yet another alternative embodiment, it may be sufficient to identify potential pseudo-nodes and their contents. As shown in FIG. 17A, the resulting CFG is no longer cyclic, if loop2 node 1702 is treated as a single SESE CFG region. In yet another alternative embodiment of the invention, the process of loop restructuring may be used to identify potential acyclic regions or to group various cyclic regions to create acyclic CFG regions.

Figure 18:
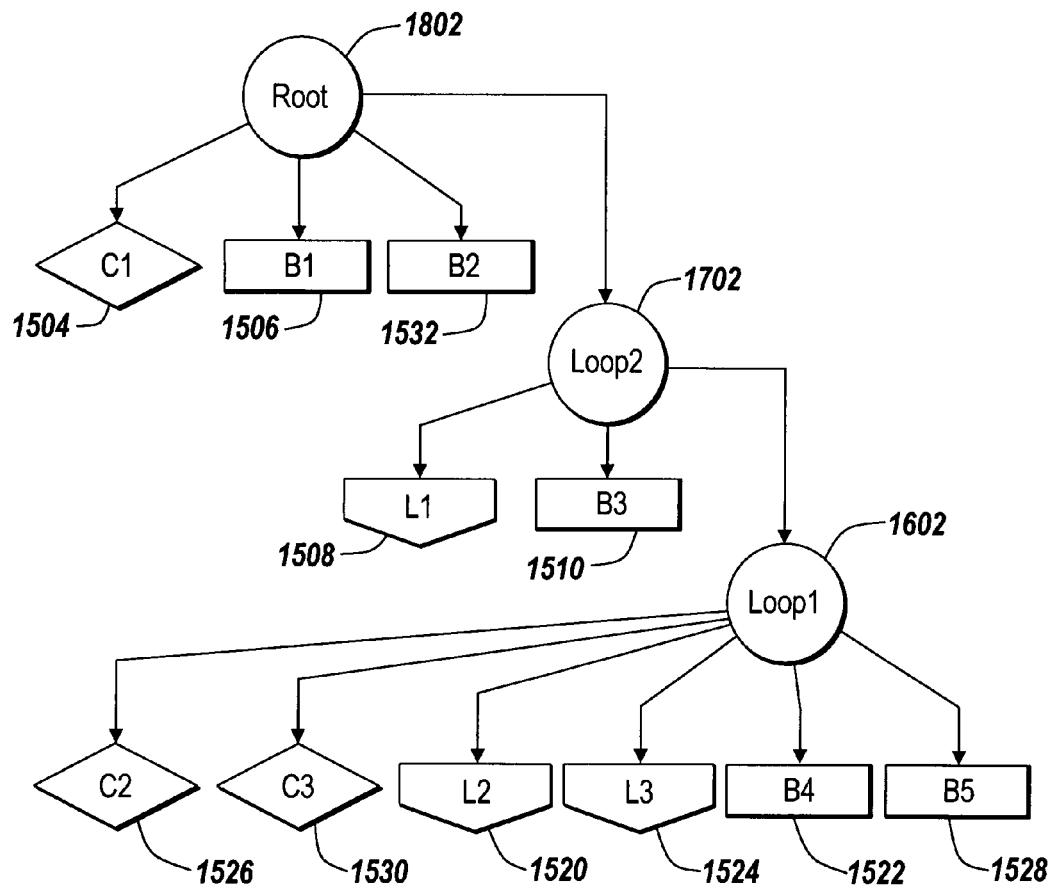
FIG. 18 is a schematic representation of a loop structure tree (LST) of the cyclical region of FIG. 15A.

FIG. 18 illustrates a schematic tree of various nodes of CFG 1580, arranged in a tree structure based on the pseudo-nodes in which they may be contained. This schematic tree may be referred to as a Loop Structure Tree (LST). The top level root of the LST (1802) represents the entire original CFG (1580). Each of its child loops consists of "inner loops." Each of its inner loops can be thought of as a subgraph that includes one or more entry edges, one or more exit edges and one or more back edges. In this tree view, the children of each tree node are the "inner loops" contained within that loop, which can arise from nested loops. The leaves of the LST are the original SESE nodes that come from CFG 1580. The leaves are not necessarily loops themselves (although they may contain internal loops, even if not visible at a higher level of CFG abstraction), but in one embodiment it may be convenient to represent them or keep track of them in the LST. In an alternative embodiment, they may be omitted from the LST. In yet another embodiment, a different structure may be used to keep track of different nodes from the original CFG region that is being restructured.

Figure 19:
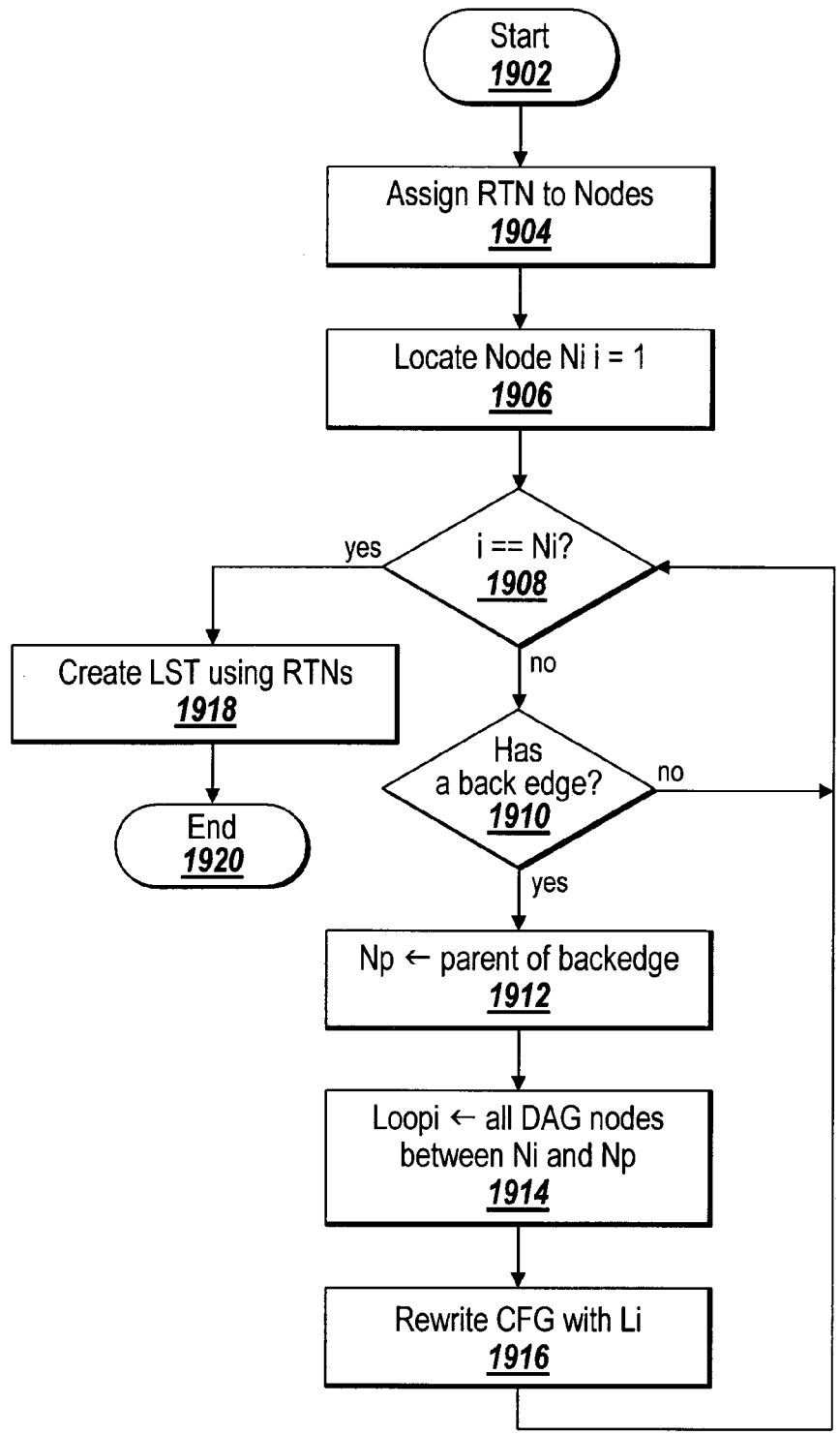
FIG. 19 is a schematic flow chart for creating a loop structure tree for an arbitrary SESE CFG section.

FIG. 19 is a schematic flow chart for creating a loop structure tree for an arbitrary SESE CFG section. This LST-creation process may be used as for creating pseudo-nodes and/or locating possible chained and/or nested cycles.

After the start of the LST-creation process (1902), a Reverse Topological Number (RTN) is assigned to each node in the CFG section (1904). In one embodiment of the invention, an RTN for each node is obtained by performing a depth-first search on the CFG and assigning to each node a number according to the order in which the depth first search has finished exploring the node. Alternatively, the RTN ordering may be said to be the reverse post-ordering of the nodes in a graph after the depth-first search. Generally, a node Ni has a smaller RTN than a node Ny if the only way to get from Ni to Ny is through a back edge. In one embodiment, the back edges and the edges belonging to a directed acyclic graph (DAG) subgraph of the CFG region may also be discovered and marked during the depth-first search. In alternative embodiments, other techniques may be used for assigning RTNs to nodes, as deemed appropriate by one of skill in the art. Some SESE CFGs may have more than one possible topological sorting—that is, there may be more than one possible RTN assignment for each node, depending on the path the depth-first search takes. In one embodiment, any of the possible consistent node RTN assignments may be used for the LST-creation process.

The LST creation starts with the node having the lowest RTN (1906) and proceeds until all nodes N1 through Nn are explored (1908), where "n" represents the total number of nodes in the CFG region under consideration. For each node Ni that has at least one incident back-edge (1910)—that is, a back-edge that enters the node Ni—the originating node of the back-edge is located (1912). In an alternative notation, this may be represented as:

Np←parent of back-edge incident to Ni

A pseudo-node or a loop node may then be created using all nodes between Ni and Np that belong to a directed acyclic graph discovered during the depth-first search (1914). In one embodiment, the created pseudo-node represents a potential CFG cycle in need of restructuring. In an alternative embodiment, the created pseudo-node represents a loop that may be abstracted into a SESE region, with or without additional restructuring. In one embodiment, the created pseudo-node may be given the RTN of node Ni, which becomes one of the nodes in the new pseudo-node. For ease of description, a loop node with RTN of "i" may be indicated as "Loopi" herein.

Once the loop node has been created, the CFG may be rewritten using the new loop node in place of the nodes it contains (1916), and the LST-creation process may proceed to the next node with the next lowest number in the reverse topological order (back to 1908). In one embodiment, locating the loops using the reverse topological sorting order may provide a sorting of the most nested loops first, followed by the less-nested loops. The loops that are not nested relative to each other will appear in the order of their RTNs. Applying the process illustrated in FIG. 19 to the CFG of FIG. 15 will result in the LST shown in FIG. 18. Just as there may be multiple RTN assignments, there may be multiple valid corresponding LSTs for some graphs.

In one embodiment, the locating of chained and/or nested cycles may be sufficient. In another embodiment, some or all of the located cycles may be examined to determine whether they are structured or not. In yet another embodiment, the located unstructured cycles may be processed to generate functionally equivalent structured cycles.

Figure 20:
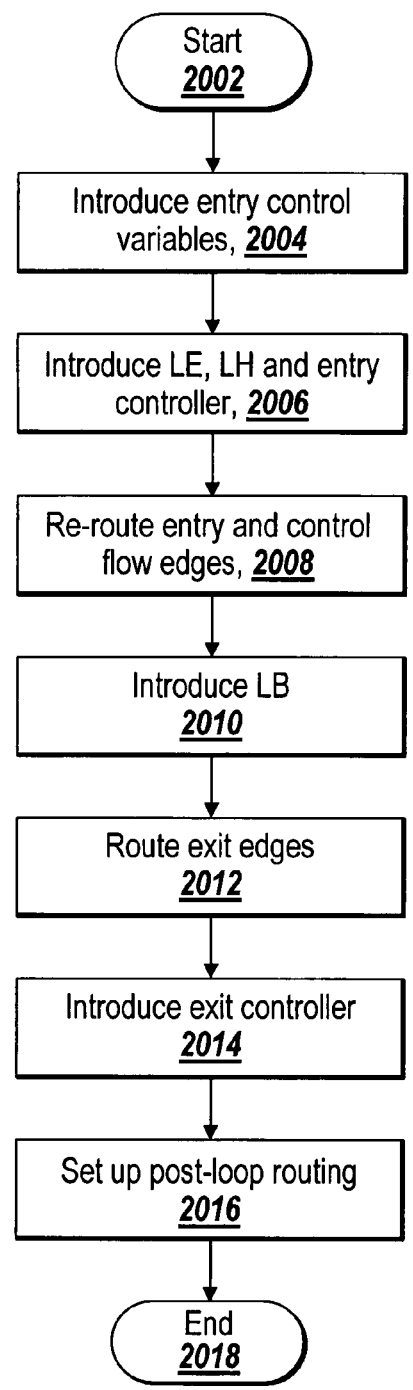
FIG. 20 is a schematic flow chart for structuring an unstructured cycle.

FIG. 20 is a schematic flow chart for structuring an unstructured cycle. In one embodiment, the innermost loops are restructured first. In alternative embodiments, different approaches may be taken. "Restructuring" a loop may mean converting it into a single entry, single exit, single back-edge loop. In one embodiment, such restructuring may be done by introducing extra variables "guarding" or "controlling" some regions of CFG based on the value of the guard/control variables set on various paths leading to those regions. In discussion of acyclic CFG restructuring above, those variables are referred to as "guard variables." They are referred to as "control variables" herein in the context of cyclical CFG restructuring, although that should not be taken to mean that guard variables have to be different from control variables.

In one embodiment, guard variables and control variables are of the same type, for example, integers, booleans or other data structures. In an alternative embodiment, some of the same variables may be used for both guard and/or control variables, as long as their values are properly accounted for on all paths. In yet another embodiment, different ranges of values for the same variables may be used for guard and control variables. In yet another embodiment, techniques other than guard/control variables may be used to control access to particular sections of the CFG.

Figure 21A:
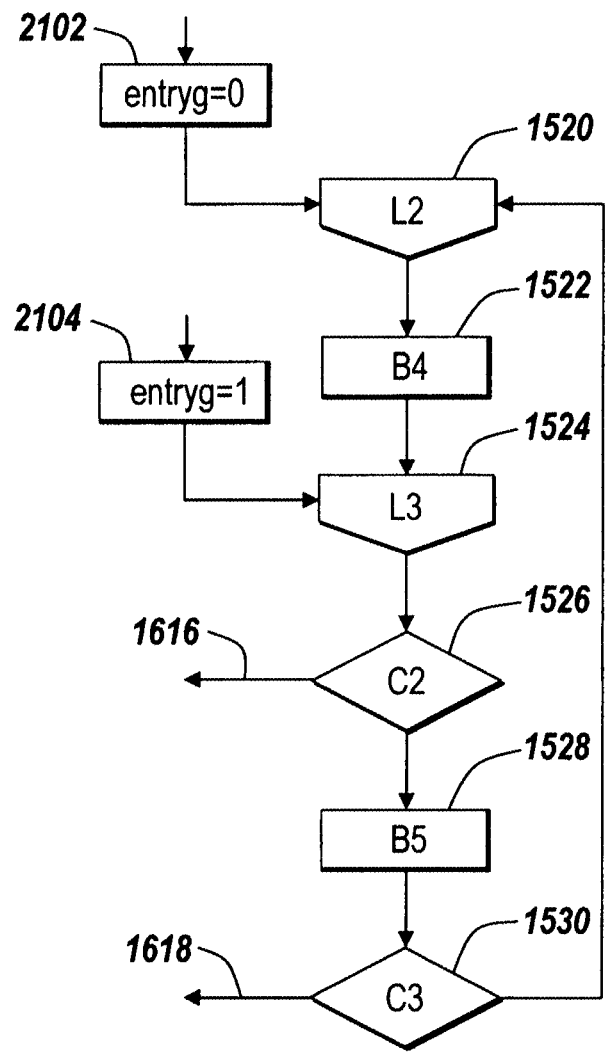
FIGS. 21A-C illustrate the operation of the process of FIG. 20 on the cyclical region of FIG. 15A.
Figure 21B:
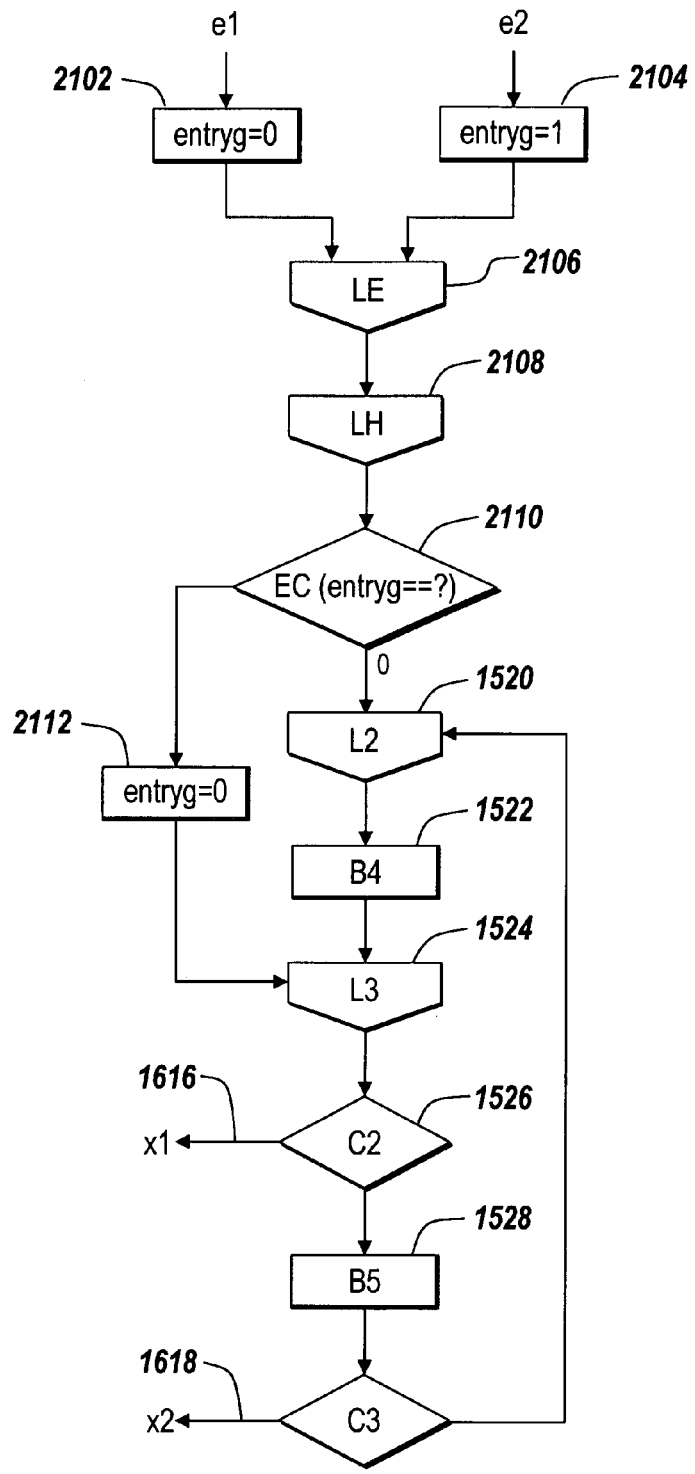
Figure 21C:
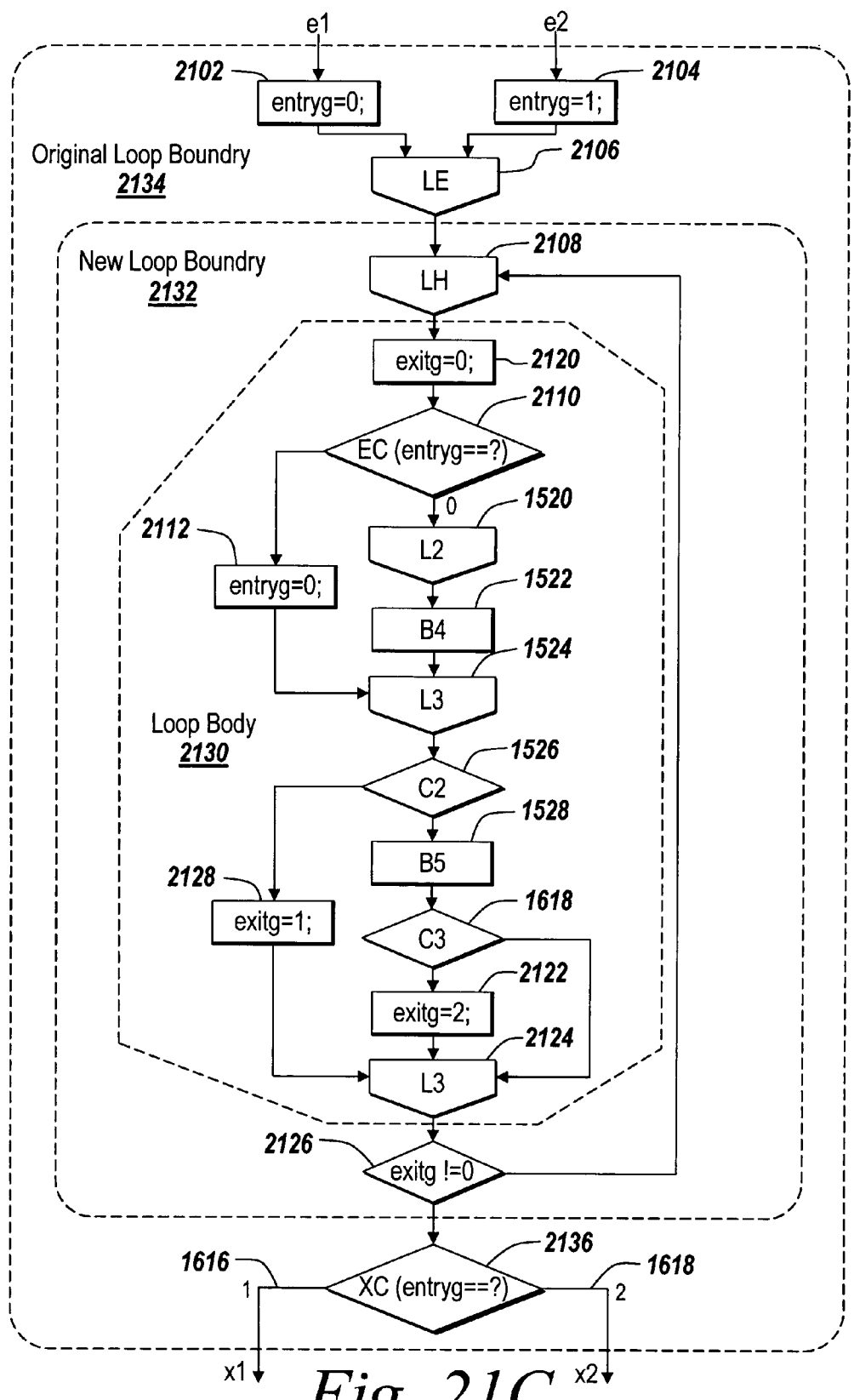

The discussion of the restructuring process of FIG. 20 is accompanied with illustrations of its application to the innermost loop of CFG 1580 (Loop1 1602), as shown in FIGS. 21A-C.

After the loop restructuring process begins (2002), one or more control variables may be introduced on each path leading into the loop (2004). A different assignment may be given to the same control variable on different entry paths. The introduction of control variable "entryg" into Loop1 1602 is shown in FIG. 21A. Two new assignments have been added: the value of entryg is set to "0" on the top-most path into the loop (2102) and is set to "1" on the remaining path into the loop (2104). In languages or IRs requiring variable declarations, all relevant control and/or guard variables may be declared at the very entry to the CFG or at the entry to the CFG regions where they are used.

After the introduction of entry control variables, new nodes may be added to the top (the head) of the loop. Such nodes may be a new MERGE node called LE that serves as the entry node into the loop for all paths into the loop (node 2106 in FIG. 21B), and a new two-input MERGE node LH (node 2101 in FIG. 21B), which may be treated as the "head" of the restructured loop. Beneath the LH MERGE node, an "entry controller" may be introduced (2006). An entry controller is a CFG node, which directs the flow of control based on the value of the entry control variables. The entry controller may be a CONDITION node, as shown in FIG. 21B (2110) or any other kind of flow of control construct, for example, a SWITCH node or a set of one or more IF/THEN nodes. The entry controller routes the flow of control to the nodes that used to be the entrance nodes into the loop in such a way that each path on which a particular value of the control variable was set continues to its original destination. For example, as shown in FIG. 21B, if the variable entryg is set to "0", the entry controller routes the flow of control to node L2 1520, exactly where edge e1 1612 led in the original CFG. If the variable entryg is set to "1," the entry controller routes the flow of control to node L3 1524, which was the incident node for edge e2 1614 in the original CFG.

In addition to routing the flow of control appropriately, the restructuring process re-sets the value of entry control variables on some of the paths, so that the next time the body of the loop is executed, the flow of control runs through all of the loop, without skipping the sections that may be skipped during the original entry. Resetting entryg to "0" on the path where it was originally set to "1" (2112), allows for the restructured loop to exactly mimic the behavior of the original unstructured loop. After the entry variables have been set appropriately, the back edges of the loop may be routed directly to the LH node (2008). The resulting loop has only one loop entry node (LH 2108), which may be sufficient for some applications, as determined by one of skill in the art. In other embodiments, restructuring may proceed so as to generate the loop with a single entry and a single exit nodes.

To restructure the exits of the loop, an approach similar to the loop entry restructuring may be taken. To this end, a MERGE node may be introduced at the bottom of the loop (2010). Such node may be referred to as LB (loop bottom). All the original exits from the loop may be routed to LB node (2012). For every exit that is rerouted to LB node, a control variable assignment is added to the path. Such control variables may be referred to as "exit control variables." For example, shown in FIG. 21C are assignments to exit control variable "exitg." Exitg is set to "0" on every path that has leads to the repetition of the loop (2120) and to other values on the paths that lead outside the loop. In the case of the CFG of FIG. 21C, exitg is set to "1" on path 1616 that originally led out of the loop from node C2 1526 (2128) and to "2" on path 1618 that originally led out of the loop from node C3 1530 (2122). The values used herein are not restrictive of the range of values that may be applied, as determined by one of skill in the art.

An exit controller is introduced below node LB (2014). The exit controller routes the low of control back to the head of the loop if the exit variables are not set to the values necessitating the exit from the loop. In the example shown in FIG. 21C, the exit variable values other than "0" indicate that the loop must be exited (2126). If exitg is equal to "0," the flow of control passes back to loop head node LH 2108.

The loop now has a single entry node and a single exit node, and what remains is to account for the proper post-loop routing. To that end, a CONDITION node or any other control flow construct may be used to route the flow of control based on the value of exit control variables (2016). In FIG. 21C, such routing is done at node 2136, which routes the flow of control back to the original destination of path 1616 if exitg is set to "1" and to the original destination of path 1618 if exitg is set to "2." A comparison with FIG. 15 will indicate that the control flow semantics of the entries and exits to the original loop have been preserved.

Shown in FIG. 21C is Loop1 1602 after restructuring. Instead of multiple entries and exits, it now contains new loop body 2130, having one loop head 2108 and one loop exit 2126 within the confines of the original loop boundary 2134. The resulting loop 2130 is a SESE cycle having a single back-edge. If necessary, Loop1 1602 may now be abstracted as a single SESE CFG node.

Using the process of FIG. 20, other loops in the CFG may be restructured. In some cases, the CFG region inside the loop body may have become unstructured during the loop restructuring process. In one embodiment, the loop body may be further restructured using the process described above in connection with acyclic CFG restructuring. In an alternative embodiment, the whole CFG may be examined again for any regions that need acyclic restructuring. In yet another embodiment, restructuring of cyclic regions may proceed before restructuring of acyclic regions.

The restructured cyclic and/or acyclic CFGs may produce structured code in code generation. Such structured code may employ only WHILE and/or DO-WHILE or similar loop constructs. The resulting generated code may be used for any number of purposes, as discussed above. Overall, any graphical and/or textual language may be used to generate one or more CFGs, which may then be restructured into one or more structured CFGs. Those structured CFGs may then be used as an input to proof checkers or static analyzers, and/or to generate code or hardware layouts or for other purposes. The generated code need not be in a language different from the original model language.

For example, one application of one embodiment may be to take diagrams from a state chart modeling language (e.g. Stateflow® modeling environment) and to "simplify" them by creating structured regions from previously unstructured ones. The structured regions may be easier to understand for a user, or they may be abstracted as another layer in a hierarchy or as a separate function or region. In an alternative embodiment, such restructuring of the original code may be performed on any other textual and/or graphical language, and may be done for optimization, simplification, visualization, scheduling, analysis, proving, code generation, and other purposes, as deemed appropriate by one of skill in the art.

Different embodiments may be implemented on various hardware and/or software systems, as deemed appropriate by one of skill in the art. Processing may be accomplished on a single processing unit or on multiple processing units, serially or in parallel. A processing unit may be a computer, a thread, a processor, a network of processing units, a core in a multi-core processor, a field programmable gate array (FPGA), a specially-designed hardware chip (e.g., an application specific integrated circuit (ASIC)), a general purpose computation chip (e.g., a microprocessor), a portable device, a biological computing device, an optical computing device, etc., and any combination of the above.

Some embodiments of the invention may be provided as a service, such as, for example, a web service or a distributed service. Some embodiments of the invention may make use of parallel or multiple processors, or be implemented on a supercomputer. Yet other embodiments of the invention may be employed with interpreted languages and process code as part of the execution.

Exemplary embodiments are discussed in detail above. While specific exemplary embodiments are discussed, it should be understood that this is done for illustration purposes only. In describing and illustrating the exemplary embodiments, specific terminology is employed for the sake of clarity. However, the exemplary embodiments are not intended to be limited to the specific terminology so selected. A person skilled in the relevant art will recognize that other components and configurations may be used without parting from the spirit and scope of the exemplary embodiments. It is to be understood that each specific element includes all technical equivalents that operate in a similar manner to accomplish a similar purpose. Each reference cited herein is incorporated by reference. The examples and embodiments described herein are non-limiting examples.

The invention claimed is:

1. A computer-implemented method comprising:
generating, using a processor of a computing device, a control flow graph for at least a portion of a model, wherein the control flow graph comprises an unstructured cyclical region having:
a cycle,
a back-edge,
a head node, and
two or more merge nodes in the cycle, wherein the merge nodes represent nodes at which two or more edges of the control flow graph converge;
locating the unstructured cyclical region in the control flow graph, the locating using the processor of the computing device, the locating comprising:
searching the cycle of the control flow graph for the two or more merge nodes,
examining a flow of control between respective pairs of the two or more merge nodes,
determining that the flow of control results in an instruction to skip a command in the control flow graph, where:
the instruction goes to a different command in the control flow graph when the flow of control causes the instruction to skip the command, and
identifying the unstructured cyclical region as a region between one of the respective pairs of merge nodes when the flow of control causes the instruction to skip the command; and
generating, using the processor of the computing device, a structured cyclical region by restructuring the unstructured cyclical region, wherein generating the structured cyclical region comprises:
re-routing the back-edge of the unstructured cyclical region to the head node of the unstructured cyclical region; and
routing the flow of control from a first location inside the unstructured cyclical region to a second location inside the unstructured cyclical region, the routing using a test of a control variable.

2. The computer-implemented method of claim 1, wherein the routing of the flow of control further comprises:
setting the control variable to a predetermined value on every path leading through and/or outside the cycle.

3. The computer-implemented method of claim 2, wherein the test of the control variable is a test for the predetermined value.

4. The computer-implemented method of claim 2, further comprising:
routing a control flow after the cyclical region based on a value of the control variable.

5. The computer-implemented method of claim 1, wherein the generating the structured cyclical region further comprises:
routing all entry paths into the unstructured cyclical region to a single node.

6. The computer-implemented method of claim 5, wherein the routing all the entry paths into the unstructured cyclical region further comprises:
setting an entry control variable to a value that is predetermined on every path that originally led into the unstructured cyclical region; and
routing the flow of control within the unstructured cyclical region based on the value of the entry control variable.

7. The computer-implemented method of claim 6, further comprising:
resetting the value of the entry control variable on different paths through the unstructured cyclical region.

8. The computer-implemented method of claim 1, further comprising:
routing all exits from the unstructured cyclical region through one node at a bottom of the unstructured cyclical region.

9. The computer-implemented method of claim 8, further comprising:
setting the control variable to a predetermined value on all paths that lead out of the unstructured cyclical region.

10. The computer-implemented method of claim 1, wherein the unstructured cyclical region is a first unstructured cyclical region, and wherein the method further comprises:
identifying a second unstructured cyclical region within the control flow graph, wherein the first unstructured cyclical region is within the second cyclical region; and
restructuring the second unstructured cyclical region.

11. The computer-implemented method of claim 1, wherein identifying the unstructured cyclical region further comprises:
generating a loop structure tree for the control flow graph.

12. The computer-implemented method of claim 1, wherein identifying the unstructured cyclical region further comprises:
identifying a reverse topological ordering of one or more nodes within the control flow graph.

13. The computer-implemented method of claim 1, further comprising:
restructuring an acyclical region within the structured cyclical region.

14. The computer-implemented method of claim 1, wherein the structured cyclical region is functionally equivalent to the unstructured cyclical region.

15. The computer-implemented method of claim 1, further comprising:
generating code from the control flow graph.

16. The computer-implemented method of claim 15, wherein generated code is in at least one or a combination of the following languages: C, C++, Java, Java bytecode, Assembly, MATLAB, a hardware description language (HDL), or a PLC programming language.

17. The computer-implemented method of claim 1, wherein the model is represented in a first graphical and/or textual language, and wherein the method further comprises:
generating code in the first graphical and/or textual language from the control flow graph after creating the structured cyclical region.

18. The computer-implemented method of claim 1, further comprising:
modifying an intermediate representation generated from the model based on the generated structured cyclical region of the control flow graph.

19. The computer-implemented method of claim 1, further comprising:
modifying the model based on the generated structured cyclical region of the control flow graph.

20. The computer-implemented method of claim 1, wherein the model is a model in a state chart diagramming environment, and wherein the method further comprises:
modifying a visual representation of the model in the state chart diagramming environment based on the generated structured cyclical region of the control flow graph.

21. The computer-implemented method of claim 1, further comprising:
generating an intermediate representation from the model using a graphical language.

22. The computer-implemented method of claim 1, further comprising:
generating an intermediate representation from the model using a language comprising a subset of commands that are compatible with a MATLAB programming environment.

23. A computer-implemented method comprising:
generating, using a processor of a computing device, a control flow graph from a model, wherein the control flow graph comprises an unstructured cyclical region having:
a cycle,
a back-edge,
a head node, and
two or more merge nodes in the cycle at which two or more edges of the control flow graph converge;
locating, using the processor, the unstructured cyclical region in the control flow graph, the locating comprising:
searching the cycle of the control flow graph for the two or more merge nodes,
examining a flow of control between respective pairs of the two or more merge nodes, and
determining that the flow of control results in an instruction to skip a command in the control flow graph, where:
the instruction goes to a different command in the control flow graph when the flow of control causes the instruction to skip the command, and
identifying the unstructured cyclical region as a region between one of the respective pairs of merge nodes when the flow of control causes the instruction to skip the command;
restructuring the control flow graph by structuring the unstructured cyclical region of the control flow graph, wherein the structuring comprises:
re-routing the back-edge of the unstructured cyclical region to the head node of the unstructured cyclical region, and
routing the flow of control from a first location inside the unstructured cyclical region to a second location inside the unstructured cyclical region, the routing using a test of a control variable; and
generating code from the restructured control flow graph using the processor.

24. The method of claim 23, wherein the generated code is a hardware description.

25. The method of claim 24, wherein the hardware description comprises at least one or a combination of: an HDL description or a VHDL description.

26. The method of claim 23, wherein the model is a graphical model.

27. The method of claim 23, wherein the model is a textual model.

28. The method of claim 23, further comprising:
simulating, in a modeling environment, the generated code.

29. A non-transitory computer-readable medium holding computer-executable instructions, the instructions comprising:
one or more instructions that, when executed by a processor of a computing device, cause the processor to:
generate a control flow graph for at least a portion of a model, wherein the control flow graph comprises an unstructured cyclical region having:
a cycle,
a back edge,
a head node, and
two or more merge nodes in the cycle at which two or more edges of the control flow graph converge;
locate the unstructured cyclical region in the control flow graph, the locating comprising:
searching the cycle of the control flow graph for the two or more merge nodes,
examining a flow of control between respective pairs of the two or more merge nodes,
determining that the flow of control results in an instruction to skip a command in the control flow graph, where:
the instruction goes to a different command in the control flow graph when the flow of control causes the instruction to skip the command, and
identifying the unstructured cyclical region as a region between one of the respective pairs of merge nodes when the flow of control causes the instruction to skip the command; and
generate a structured cyclical region by restructuring the unstructured cyclical region, wherein generating the structured cyclical region comprises:
re-routing the back-edge of the unstructured cyclical region to the head node of the unstructured cyclical region; and
routing the flow of control from a first location inside the unstructured cyclical region to a second location inside the unstructured cyclical region using a test of a control variable.

30. The computer-readable medium of claim 29, wherein the instructions further comprise:
one or more instructions that, when executed by the processor, cause the processor to set the control variable to a predetermined value on every path that leads through and/or outside the cycle.

31. The computer-readable medium of claim 30, wherein the test of the control variable is a test for the predetermined value.

32. The computer-readable medium of claim 30, wherein the instructions further comprise:
one or more instructions that, when executed by the processor, cause the processor to route control flow after the unstructured cyclical region based on a value of the control variable.

33. The computer-readable medium of claim 29, wherein the instructions further comprise:
one or more instructions that, when executed by the processor, cause the processor to route all entry paths into the unstructured cyclical region to a single node.

34. The computer-readable medium of claim 33, wherein the instructions further comprise:
one or more instructions that, when executed by the processor, cause the processor to:
set a value of an entry control variable to a predetermined value on every path that leads into the unstructured cyclical region; and
route the flow of control within the unstructured cyclical region based on the value of the entry control variable.

35. The computer-readable medium of claim 34, wherein the instructions further comprise:

one or more instructions that, when executed by the processor, cause the processor to reset values of the entry control variable on different paths through the unstructured cyclical region.

36. The computer-readable medium of claim 29, wherein the instructions further comprise:
    one or more instructions that, when executed by the processor, cause the processor to route all exits from the unstructured cyclical region through one node at the bottom of the unstructured cyclical region.

37. The computer-readable medium of claim 36, wherein the instructions further comprise:
    one or more instructions that, when executed by the processor, cause the processor to set the control variable to a predetermined value on all paths that lead out of the unstructured cyclical region.

38. The computer-readable medium of claim 29, wherein the unstructured cyclical region is a first unstructured cyclical region, and the instructions further comprise:
    one or more instructions that, when executed by the processor, cause the processor to:
        identify a second unstructured cyclical region within the control flow graph, wherein the first unstructured cyclical region is within the second cyclical region; and
        restructure the second cyclical region.

39. The computer-readable medium of claim 29, wherein the instructions further comprise:
    one or more instructions that, when executed by the processor, cause the processor to generate a loop structure tree for the control flow graph.

40. The computer-readable medium of claim 29, wherein the instructions further comprise:
    one or more instructions that, when executed by the processor, cause the processor to identify a reverse topological ordering of nodes within the control flow graph.

41. The computer-readable medium of claim 29, wherein the instructions further comprise:
    one or more instructions that, when executed by the processor, cause the processor to restructure an acyclical region within the structured cyclical region.

42. The computer-readable medium of claim 29, wherein the instructions further comprise:
    one or more instructions that, when executed by the processor, cause the processor to generate code from the control flow graph.

43. The computer-readable medium of claim 42, wherein the generated code is in at least one or a combination of the following languages: C, C++, Java, Java bytecode, Assembly, MATLAB, a hardware description language (HDL), or a PLC programming language.

44. The computer-readable medium of claim 29, wherein the model is represented in a first graphical and/or textual language, and the instructions further comprise:
    one or more instructions that, when executed by the processor, cause the processor to generate code in the first graphical and/or textual language from the control flow graph after creating the structured cyclical region.

45. The computer-readable medium of claim 29, wherein the instructions further comprise:
    one or more instructions that, when executed by the processor, cause the processor to modify an intermediate representation of the model based on the structured cyclical region of the control flow graph.

46. The computer-readable medium of claim 29, wherein the instructions further comprise:
    one or more instructions that, when executed by the processor, cause the processor to modify the model based on the structured cyclical region of the control flow graph.

47. The computer-readable medium of claim 29, wherein the model is a model in a state chart diagramming environment, and the instructions further comprise:
    one or more instructions that, when executed by the processor, cause the processor to modify a visual representation of the model in the state chart diagramming environment based on the structured cyclical region of the control flow graph.

48. The computer-readable medium of claim 29, wherein the instructions further comprise:
    one or more instructions that, when executed by the processor, cause the processor to generate an intermediate representation for the model using a graphical language.

49. The computer-readable medium of claim 29, wherein the instructions further comprise:
    one or more instructions that, when executed by the processor, cause the processor to generate an intermediate representation for the model from a language including a subset of commands that are compatible with a MATLAB programming environment.

50. A non-transitory computer-readable medium holding instructions, the instructions comprising:
    one or more instructions that, when executed by a processor of a computing device, cause the processor to:
        generate a control flow graph from a model, wherein the control flow graph comprises an unstructured cyclical region having:
            a cycle,
            a back edge,
            a head node, and
            two or more merge nodes in the cycle at which two or more edges of the control flow graph converge;
        locate the unstructured cyclical region in the control flow graph, the locating comprising:
            searching the cycle of the control flow graph for the two or more merge nodes,
            examining a flow of control between respective pairs of the two or more merge nodes,
            determining that the flow of control results in an instruction to skip a command in the control flow graph, where:
                the instruction goes to a different command in the control flow graph when the flow of control causes the instruction to skip the command, and
            identifying the unstructured cyclical region as a region between one of the respective pairs of merge nodes when the flow of control causes the instruction to skip the command;
        restructure the control flow graph by structuring an unstructured cyclical region of the control flow graph, wherein the restructuring comprises:
            re-routing the back-edge of the unstructured cyclical region to the head node of the unstructured cyclical region, and
            routing the flow of control from a first location inside the unstructured cyclical region to a second location inside the unstructured cyclical region, the routing using a test of a control variable; and
        generate code from the restructured control flow graph.

51. The computer-readable medium of claim 50, wherein the generated code is a hardware description.

52. The computer-readable medium of claim 51, wherein the hardware description comprises at least one or a combination of: an HDL description or a VHDL description.

53. The computer-readable medium of claim 50, wherein the model is a graphical model.

54. The computer-readable medium of claim 50, wherein the model is a textual model.

55. The computer-readable medium of claim 50, further comprising:
   simulating, in a modeling environment, the generated code.

56. A computer-implemented system comprising:
   a processor for processing:
      a first control flow graph representing at least a portion of a model, the first control flow graph comprising an unstructured cyclical region, where the unstructured cyclical region comprises:
         a cycle,
         a back edge,
         a head node, and
         two or more merge nodes in the cycle at which two or more edges of the first control graph converge;
      a restructured control flow graph comprising no unstructured cyclical regions and being functionally equivalent to the first control graph;
      instructions to generate a structured cyclical region comprising:
         instructions to locate the unstructured cyclical region in the first control graph that, when executed by the processor, cause the processor to:
            search the cycle of the first control graph for the two or more merge nodes,
            examine a flow of control between respective pairs of the two or more merge nodes,
            determine that the flow of control results in an instruction to skip a command in the control flow graph, where:
               the instruction goes to a different command in the control flow graph when the flow of control causes the instruction to skip the command, and
            identify the unstructured cyclical region as a region between one of the respective pairs of merge nodes when the flow of control causes the instruction to skip the command;
         instructions to re-route the back-edge of the unstructured cyclical region to the head node of the unstructured cyclical region;
         instructions to route the flow of control from a first location inside the unstructured cyclical region to a second location inside the unstructured cyclical region, the routing using a test of a control variable; and
      executable code generated from the restructured control flow graph.

57. A computer-implemented system comprising:
   means for generating a control flow graph from at least a portion of a model;
   means for identifying an unstructured cyclical region of the control flow graph, where the unstructured cyclical region comprises:
      a cycle,
      a back edge,
      a head node, and
      two or more merge nodes in the cycle at which two or more edges of the control flow graph converge, and
   wherein the identifying comprises:
      searching the cycle of the control flow graph for the two or more merge nodes,
      examining a flow of control between respective pairs of the two or more merge nodes,
      determining that the flow of control results in an instruction to skip a command in the control flow graph, where:
         the instruction goes to a different command in the control flow graph when the flow of control causes the instruction to skip the command, and
      identifying the unstructured cyclical region as a region between one of the respective pairs of merge nodes when the flow of control causes the instruction to skip the command;
   means for restructuring the control flow graph by structuring the unstructured cyclical region of the control flow graph, wherein the restructuring comprises:
      re-routing the back-edge of the unstructured cyclical region to the head node of the unstructured cyclical region, and
      creating a structured cyclical region by routing the flow of control from a first location inside the unstructured cyclical region to a second location inside the unstructured cyclical region, the routing using a test of a control variable; and
   means for generating code from the restructured control flow graph.

* * * * *

UNITED STATES PATENT AND TRADEMARK OFFICE
CERTIFICATE OF CORRECTION

| | | |
|---|---|---|
| PATENT NO. | : 8,826,255 B1 | Page 1 of 1 |
| APPLICATION NO. | : 11/820058 | |
| DATED | : September 2, 2014 | |
| INVENTOR(S) | : Avadhanula et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this
Eighteenth Day of August, 2015

Michelle K. Lee
*Director of the United States Patent and Trademark Office*